(12) United States Patent
Tanaka et al.

(10) Patent No.: US 11,073,698 B2
(45) Date of Patent: Jul. 27, 2021

(54) IMAGE DISPLAY DEVICE AND DISPLAY APPARATUS

(71) Applicant: SONY CORPORATION, Tokyo (JP)

(72) Inventors: Eiichi Tanaka, Chiba (JP); Hirokazu Tatsuta, Kanagawa (JP); Yuichi Hasegawa, Tokyo (JP); Kenta Kawamoto, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/578,950

(22) Filed: Sep. 23, 2019

(65) Prior Publication Data

US 2020/0012111 A1 Jan. 9, 2020

Related U.S. Application Data

(63) Continuation of application No. 15/327,393, filed as application No. PCT/JP2015/064925 on May 25, 2015, now Pat. No. 10,564,424.

(30) Foreign Application Priority Data

Aug. 18, 2014 (JP) .................................. 2014-165735

(51) Int. Cl.
*G02B 27/01* (2006.01)
*H04N 5/64* (2006.01)

(52) U.S. Cl.
CPC .... *G02B 27/0172* (2013.01); *G02B 2027/011* (2013.01); *G02B 2027/0132* (2013.01); *H04N 5/64* (2013.01)

(58) Field of Classification Search
CPC .......... G02B 27/0172; G02B 2027/011; G02B 2027/0132
(Continued)

(56) References Cited

U.S. PATENT DOCUMENTS

| 5,486,841 A | * | 1/1996 | Hara | ........................ G02B 7/12 |
| | | | | 345/8 |
| 6,084,555 A | * | 7/2000 | Mizoguchi | ............... G02B 7/12 |
| | | | | 345/8 |

(Continued)

FOREIGN PATENT DOCUMENTS

| CN | 102200641 A | 9/2011 |
| JP | 06-294943 A | 10/1994 |

(Continued)

OTHER PUBLICATIONS

Notice of Allowance for U.S. Appl. No. 15/327,393, dated Oct. 3, 2019.

(Continued)

*Primary Examiner* — Ricky D Shafer
(74) *Attorney, Agent, or Firm* — Chip Law Group

(57) ABSTRACT

An image display device includes an image formation device and an optical system that brings an image from the image formation device to an eyeball of an observer. $0$ (degrees)$\leq \omega_2 < \omega_1$ is satisfied where an image-formation-device first strike point ($CP_1$) is a point where an extended line of an optical axis of the optical system intersects with an image exit surface of the image formation device, an image-formation-device second strike point ($CP_2$) is a point where an extended line of a pupil center line of the eyeball of the observer intersects with the image exit surface of the image formation device, $\omega_1$ represents an angle between the extended line of the optical axis of the optical system and a first normal line ($NL_1$), and $\omega_2$ represents an angle between the extended line of the pupil center line and a second normal line ($NL_2$).

11 Claims, 14 Drawing Sheets

(58) Field of Classification Search
USPC .................................................. 359/630, 631
See application file for complete search history.

(56) References Cited

U.S. PATENT DOCUMENTS

| | | | | |
|---|---|---|---|---|
| 6,144,347 | A * | 11/2000 | Mizoguchi | G02B 27/0172 345/8 |
| 6,157,291 | A * | 12/2000 | Kuenster | G02B 27/0172 345/8 |
| 10,534,172 | B2 * | 1/2020 | Tanaka | G02B 27/0172 |
| 10,564,424 | B2 * | 2/2020 | Tanaka | G02B 27/0172 |
| 2002/0122259 | A1 | 9/2002 | Chen et al. | |
| 2010/0246023 | A1 * | 9/2010 | Tanaka | G02B 27/0176 359/630 |
| 2014/0347252 | A1 * | 11/2014 | Miyawaki | G06F 3/1423 345/8 |
| 2015/0346494 | A1 * | 12/2015 | Tanaka | G02B 27/017 345/647 |
| 2016/0041394 | A1 * | 2/2016 | Tanaka | G02B 27/0172 359/630 |
| 2016/0267708 | A1 * | 9/2016 | Nistico | G06F 3/167 |

FOREIGN PATENT DOCUMENTS

| | | |
|---|---|---|
| JP | 07-072449 A | 3/1995 |
| JP | 08-160884 A | 6/1996 |
| JP | 08-166541 A | 6/1996 |
| JP | 2001-209001 A | 8/2001 |
| JP | 2004-186740 A | 7/2004 |
| JP | 2010-199788 A | 9/2010 |
| JP | 2012-009001 A | 1/2012 |

OTHER PUBLICATIONS

Office Action for CN Patent Application No. 201580042802.1, dated Jul. 2, 2019, 06 pages of Office Action and 10 pages of English Translation.

Office Action for JP Patent Application No. 2016-543842, dated Dec. 10, 2019, 04 pages of Office Action and 03 pages of English Translation.

* cited by examiner

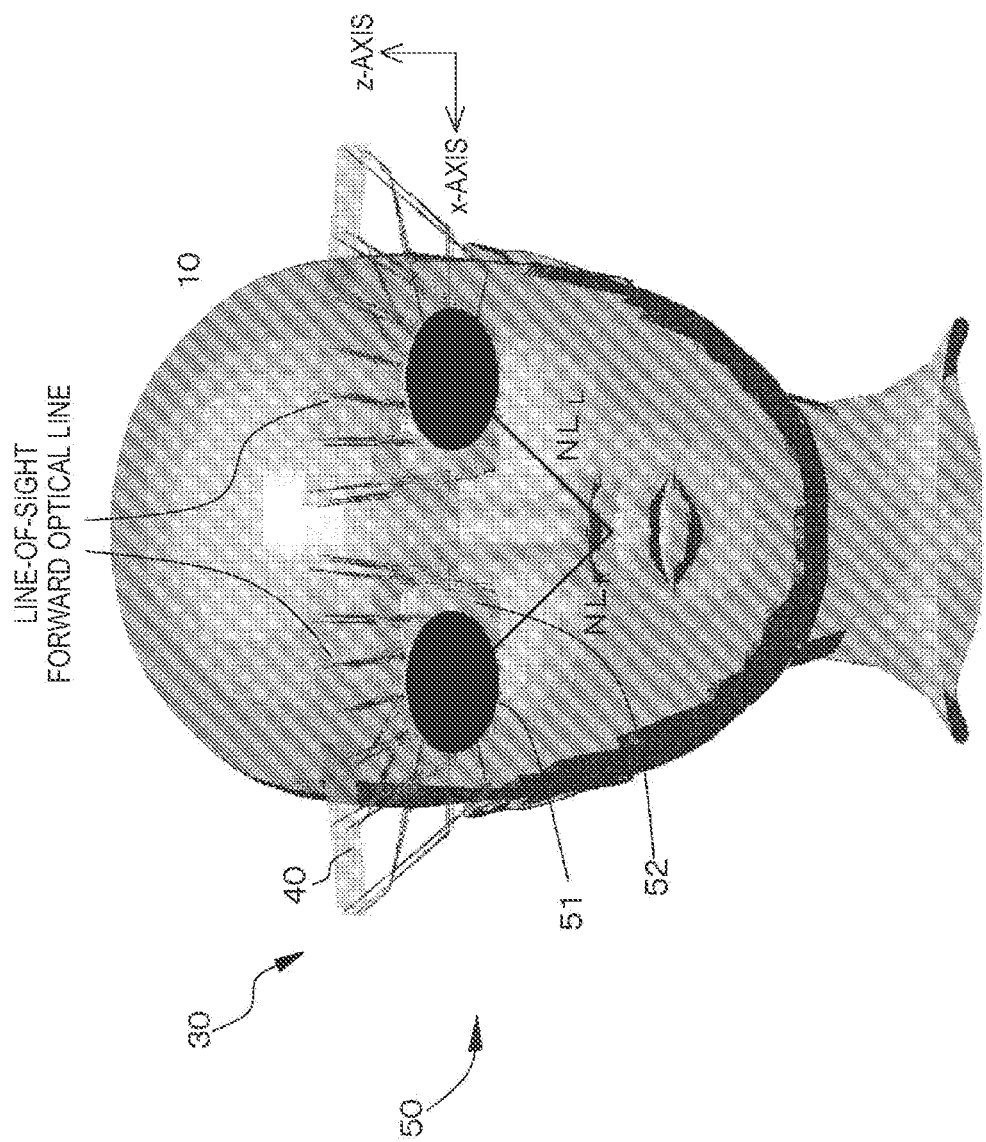

IMAGE DISPLAY DEVICE AND DISPLAY APPARATUS

CROSS REFERENCE TO RELATED APPLICATIONS

The present application is a continuation application of U.S. patent application Ser. No. 15/327,393, filed Jan. 19, 2017, which is a U.S. National Phase of International Patent Application No. PCT/JP2015/064925 filed May 25, 2015, which claims the benefit of priority from Japanese Patent Application No. JP 2014-165735 filed in the Japan Patent Office on Aug. 18, 2014. Each of the above-referenced applications is hereby incorporated herein by reference in its entirety.

TECHNICAL FIELD

The present disclosure relates to image display devices and display apparatuses. More particularly, the present disclosure relates to a display apparatus which can be used as, for example, a head mounted display (HMD), and an image display device which is suitably used in such a display apparatus.

BACKGROUND ART

A virtual-image display apparatus (display apparatus) which enables an observer to observe a two-dimensional image formed using an image formation device as a magnified virtual image, using a virtual-image optical system, is well known, as disclosed in JP H05-134208A. In a display apparatus disclosed in JP H05-134208A, a liquid crystal display unit is illuminated with light from a light source which has been collimated by a lens, through a polarizing plate, image light of the illuminated liquid crystal display unit is brought into a first focal point by lens group, and the focused light is reflected by a concave mirror, is brought into a second focal point in front of the crystalline lens of the pupil, through a polarizing plate, and reaches the retina. As a result, the user can observe an image.

CITATION LIST

Patent Literature

Patent Literature 1:
JP H05-134208A

DISCLOSURE OF INVENTION

Technical Problem

Incidentally, different observers have different inter-eyeball distances.

Therefore, the position of an image display device is adjusted in the eyeball direction of the observer (the direction of a line connecting the centers of the two eyeballs of the observer). For example, when it is assumed that an original image shown in FIG. 14A is observed by the right eye, then if the position adjustment is not most suitable, the image may be distorted as schematically shown in FIG. 14B.

Therefore, it is an object of the present disclosure to provide an image display device which has a configuration and structure which are less likely to cause a distortion in an observed image when the position of the image display device in the eyeball direction of an observer is adjusted, and a display apparatus employing such an image display device.

Solution to Problem

To achieve the above described object, an image display device according to the present disclosure includes:
(A) an image formation device; and
(B) an optical system that brings an image from the image formation device to an eyeball of an observer.

$$0 \text{ (degrees)} \leq \omega_2 < \omega_1$$

is satisfied where
an image-formation-device first strike point is defined as a point where an extended line of an optical axis of the optical system intersects with an image exit surface of the image formation device,
a first normal line is defined as a normal line to the image exit surface of the image formation device passing through the image-formation-device first strike point, an image-formation-device second strike point is defined as a point where an extended line of a pupil center line of the eyeball of the observer intersects with the image exit surface of the image formation device,
a second normal line is defined as a normal line to the image exit surface of the image formation device passing through the image-formation-device second strike point, and
$\omega_1$ represents an angle between the extended line of the optical axis of the optical system and the first normal line, and $\omega_2$ represents an angle between the extended line of the pupil center line of the eyeball of the observer and the second normal line.

To achieve the above object, a display apparatus of the present disclosure includes:
(i) a frame; and
(ii) an image display device attached to the frame.

The image display device includes the image display device of the present disclosure.

Advantageous Effects of Invention

In the image display device of the present disclosure, or the image display device included in the display apparatus of the present disclosure, the angle $\omega_1$ between the extended line of the optical axis of the optical system and the first normal line, and the angle $\omega_2$ between the extended line of the pupil center line of the eyeball of the observer and the second normal line, satisfy the predetermined relationship. Specifically, the extended line of the pupil center line (line-of-sight forward optical line) of the eyeball of the observer is substantially orthogonal to the image exit surface of the image formation device. Therefore, when the position of the image display device in the eyeball direction (x-axis direction) of the observer is adjusted, an image observed by the observer only translates in a direction substantially orthogonal to the extended line of the pupil center line (line-of-sight forward optical line), and therefore, the observed image is less likely to be distorted. Note that the advantageous effects described herein are merely illustrative and non-limiting, and additional advantageous effects may be exhibited.

BRIEF DESCRIPTION OF DRAWINGS

FIG. 8 is a perspective view of main portions of a display apparatus of Example 3 as it is worn by an observer.

MODE(S) FOR CARRYING OUT THE INVENTION

Figure 1A:
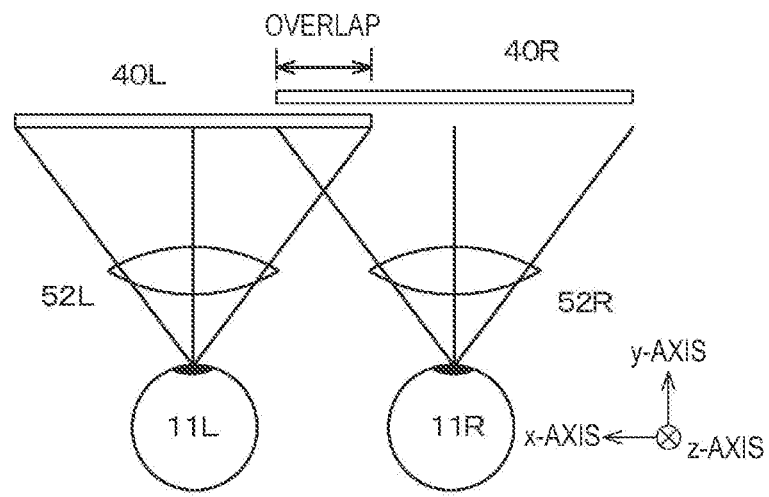
FIG. 1A and FIG. 1B are conceptual diagrams for describing a display apparatus and image display device of Example 1.

The present disclosure will now be described by way of example with reference to the drawings. The present disclosure is not limited to examples below. Various numerical values and materials in the examples are merely illustrative. Note that description will be provided in the following order.
1. Overview of image display device and display apparatus of the present disclosure
2. Example 1 (An image display device and display apparatus of the present disclosure. A display apparatus having a third configuration of the present disclosure)
3. Example 2 (A variation of Example 1)
4. Example 3 (A variation of Example 1 and Example 2. A display apparatus having a first configuration of the present disclosure)
5. Example 4 (A variation of Example 1 to Example 3. A display apparatus having a second configuration of the present disclosure)
6. Others <Overview of Image Display Device and Display Apparatus of the Present Disclosure>

In an image display device of the present disclosure and an image display device in a display apparatus of the present disclosure (these devices are hereinafter collectively referred to as the "image display device or the like of the present disclosure"), $$0 \text{ (degrees)} \leq \omega_2 \leq 1 \text{ (degrees)}$$

is preferably satisfied, although this is non-limiting.

The image display device or the like of the present disclosure including the preferable form further includes a reflecting mirror configured to reflect an image from an image formation device. An optical system can be located (inserted) between the eyeballs of an observer and the reflecting mirror, can include lens group which an image reflected by the reflecting mirror enters, and can be configured so that the optical axis of the lens group corresponds to the optical axis of the optical system. Alternatively, the optical system can also include an aperture. In these cases, the optical system can be configured to additionally include an optical member having a freeform surface which is located (inserted) between the reflecting mirror and the lens group (or the optical system). Here, a specific example of the optical member can be a lens-shaped member or a prism-shaped member. The optical member can configured to have a thickness in the light transmission direction which changes from the inside (the nose of the observer) toward the outside in a horizontal direction (an xy-plane described below). Furthermore, the freeform surface of the optical member can be configured to have an odd-order curved surface in the horizontal direction. By inserting the optical member, variations in an optical distance (optical path length) between various points on the image exit surface of the image formation device and the eyeball of the observer, can be reduced.

Note that, in other words, the optical axis of the optical system refers to a single axial line on which a light beam which enters the optical system and exits the optical system is located. Also, the pupil center line (line-of-sight forward optical line) of each eyeball of the observer is a straight line which is parallel to a perpendicular bisector of a straight line connecting the rotation centers of the left and right eyeballs, passing through the rotation center of the eyeball, and is parallel to a y-axis described below. Alternatively, the pupil center line (pupillary axis) is defined as a straight line which is perpendicular to the surface of the cornea, passing through the entrance pupil center of the eyeball.

Furthermore, in the image display device or the like of the present disclosure having the various preferable forms and configurations described above, the reflecting mirror can be in a form having a freeform surface, or alternatively, the reflecting mirror can be in a form having a concave surface. By imparting these forms to the reflecting mirror, variations in the optical distance (optical path length) between various points on the image exit surface of the image formation device and the eyeball of the observer, can also be reduced.

Furthermore, the image display device or the like of the present disclosure having the various preferable forms and configurations described above can have a form in which a point where the optical axis of the optical system intersects with the surface of the lens group facing the observer is located closer to the outside than is the pupil center line of the eyeball of the observer.

Furthermore, the image display device or the like of the present disclosure having the various preferable forms and configurations described above can have a form in which $0 < \omega_3$ is satisfied, where $\omega_3$ represents an angle between an image of the optical axis of the optical system which is projected onto a horizontal surface (an xy-plane described below) and an image of the pupil center line of the eyeball of the observer which is projected onto the horizontal surface (the xy-plane described below). Also, $\omega_1$ and $\omega_3$ preferably satisfies the following relationship:

0 (degrees)≤|ω₁−ω₃|≤1 (degrees)

The display apparatus of the present disclosure having the various preferable forms and configurations described above can have a form in which a left-eye image display device and a right-eye image display device are attached to a frame. The left-eye image display device and the right-eye image display device can each include the image display device of the present disclosure having the various preferable forms and configurations described above. Note that such a display apparatus is referred to as the "binocular display apparatus" for the sake of convenience. Here, the binocular display apparatus can have a form in which a normal line to the reflecting mirror included in the left-eye image display device intersects with a normal line to the reflecting mirror included in the right-eye image display device in a space on the opposite side of the reflecting mirrors from the observer. Note that such a form is referred to as a "display apparatus having a first configuration of the present disclosure" for the sake of convenience. In this case, a form can be provided in which the normal line to the reflecting mirror included in the left-eye image display device intersects with the normal line to the reflecting mirror included in the right-eye image display device below a virtual surface (the xy-plane described next) including both eyeballs of the observer and a point at infinity. By employing such a form, the two image formation devices can be easily located side by side with a high flexibility of design. In the binocular display apparatus, the image formation device included in the left-eye image display device and the image formation device included in the right-eye image display device may be integrated together.

Figure 11:
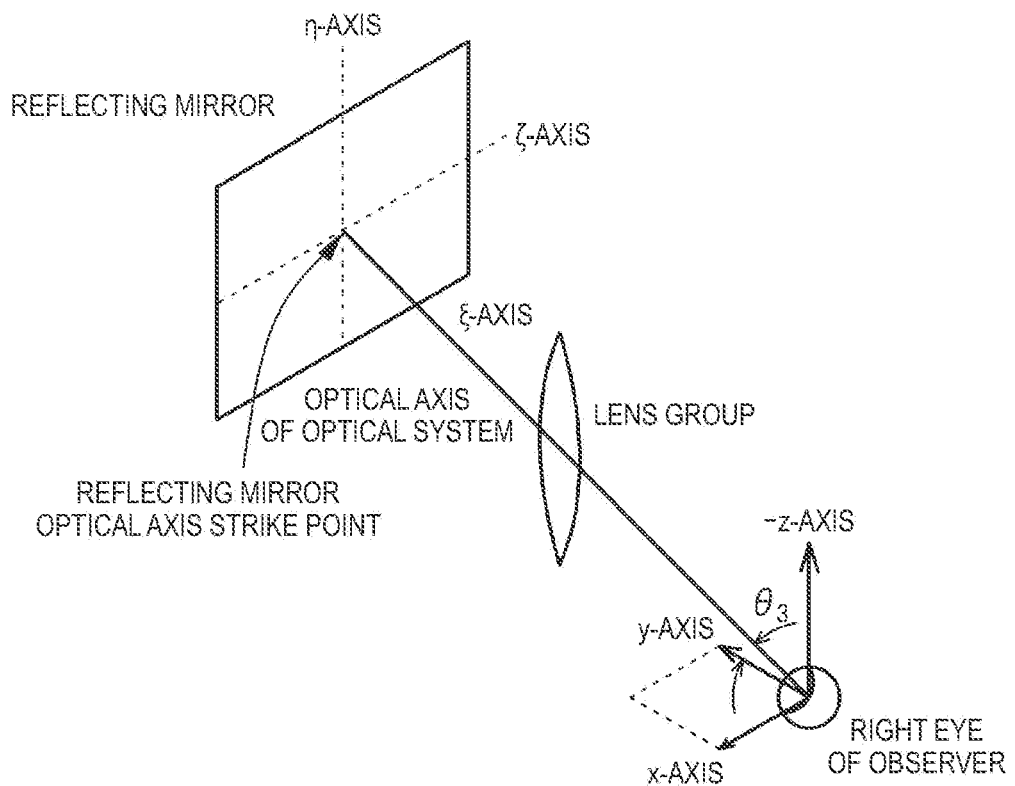
FIG. 11 is a conceptual diagram of a reflecting mirror and the like for describing where a reflecting mirror is located.
Figure 12A:
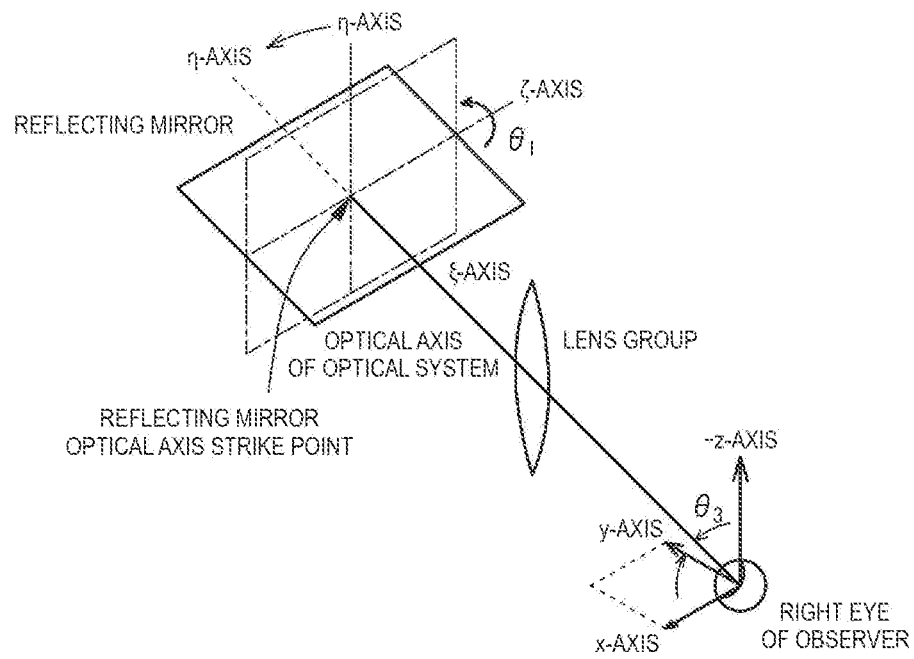
FIG. 12A and FIG. 12B are conceptual diagrams of a reflecting mirror and the like for describing where a reflecting mirror is located, following FIG. 11.
Figure 12B:
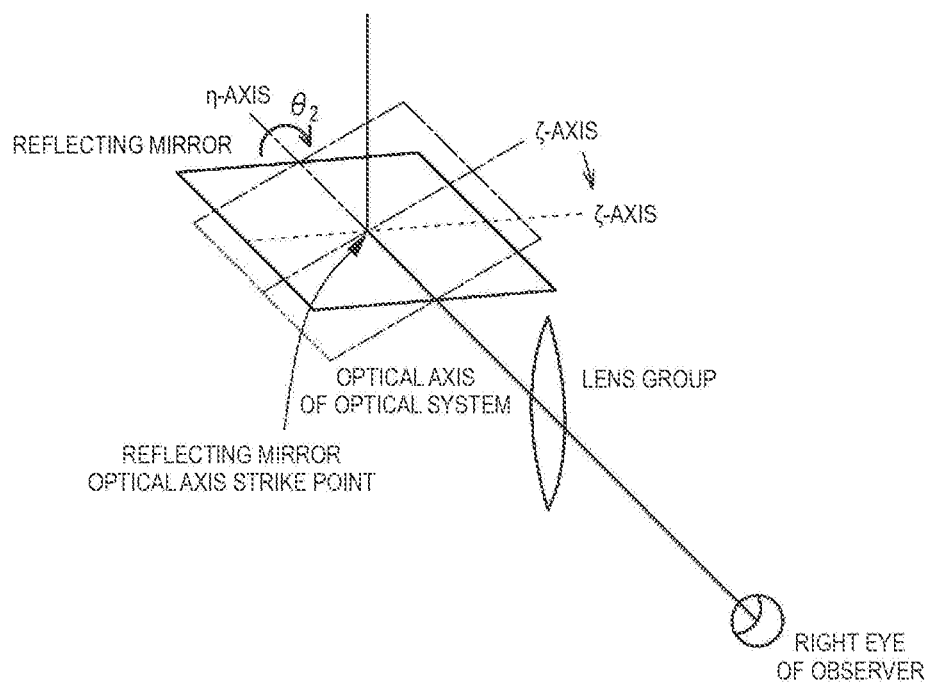
Figure 13A:
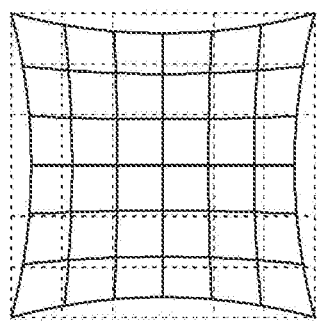
FIG. 13A, FIG. 13B, FIG. 13C, and FIG. 13D are conceptual diagrams for describing what an image to be observed is like, in the presence or absence of correction of a distortion of an image signal, in a distortion correction device.
Figure 13B:
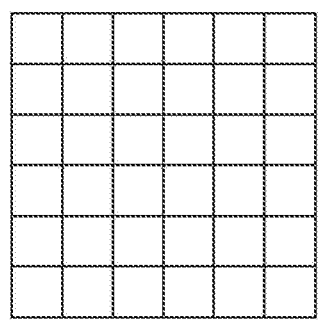
Figure 13C:
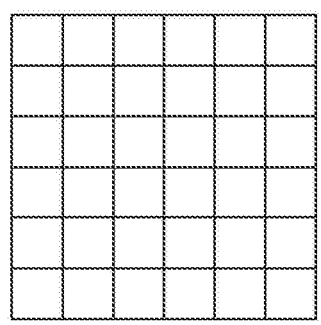
Figure 13D:
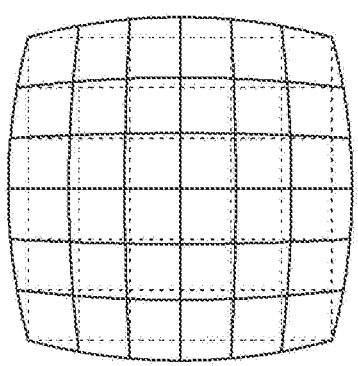

Also, in the above preferable embodiment of the display apparatus having the first configuration of the present disclosure, the reflecting mirror is located as shown in FIG. 11, FIG. 12A, and FIG. 12B, specifically as follows.

An xy-plane is defined as a virtual surface including both eyeballs of the observer and a point at infinity. An x-axis is defined as a straight line connecting both eyeballs of the observer (specifically, the x-axis is defined as an axial line which is a straight line connecting both eyeballs of the observer, extending from the right eyeball toward the left eyeball of the observer). A y-axis is defined as the pupil center line of the right eye of the observer (specifically, the y-axis is defined as an axial line which is orthogonal to the x-axis, extending toward the lens group). A "right-eye reflecting mirror optical axis strike point" is defined as a point on the reflecting mirror where the optical axis (main optical axis) of the lens group in the right-eye image display device strikes the reflecting mirror. It is assumed that the reflecting mirror in the right-eye image display device is located parallel (vertically) to an xz-plane (see FIG. 11). Furthermore, a ζ-axis is defined as an axial line on the reflecting mirror which is parallel to the xy-plane, passing through the right-eye reflecting mirror optical axis strike point. A η-axis is defined as an axial line on the reflecting mirror which is orthogonal to the ζ-axis, passing through the right-eye reflecting mirror optical axis strike point (see FIG. 11).

In this case, a plane mirror in the right-eye image display device is rotated about the ζ-axis by an angle of $\theta_1$ of 45 degrees±5 degrees with the top of the plane mirror being rotated in a direction away from the observer (see a dash-dot line in FIG. 12A indicating states before rotation of the reflecting mirror and the axial line, and a solid line and a dotted line in FIG. 12A indicating states after rotation of the reflecting mirror and the axial line), and is rotated about the η-axis by an angle $\theta_2$ of 7 degrees to 21 degrees with the right end of the plane mirror being rotated in a direction away from the observer (see a dash-dot line in FIG. 12B indicating states before rotation of the reflecting mirror and the axial line, and a solid line and a dotted line in FIG. 12B indicating states after rotation of the reflecting mirror and the axial line).

The image formation device, optical system, and reflecting mirror of the left-eye image display device can have a form in which they and the image formation device, optical system, and reflecting mirror of the right-eye image display device are mirror-symmetrical about a virtual surface which is parallel to a yz-plane, passing through the midpoint of a line segment connecting both eyeballs of the observer. Furthermore, when a ξ-axis is defined as an axial line orthogonal to the ζ-axis and the η-axis, an example of a relationship between an angle $\theta_3$ between an axial line (ι'-axis) obtained by projecting the ξ-axis onto the xy-plane and the y-axis, and the angle $\theta_1$ and the angle $\theta_2$, is shown in Table 1 below. The angle $\theta_3$ takes a positive value in the (−x, y) quadrant (see FIG. 11 and FIG. 12A). The optical axis (main optical axis) of the lens group preferably intersects with the center of the eyeball of observer. Furthermore, in these preferable forms, a form is preferable in which the image formation device is located above the reflecting mirror. Note that the ξ-axis coincides with the optical axis (main optical axis) of the lens group, and the angle $\theta_3$ is equal to the angle $\omega_3$.

TABLE 1

| $\theta_1$ (degrees) | $\theta_2$ (degrees) | $\theta_3$ (degrees) |
|---|---|---|
| 45 | 5 | 9 |
| 45 | 10 | 15 |
| 45 | 15 | 22 |
| 45 | 18 | 25 |
| 45 | 20 | 29 |

The image exit surface of the image formation device may be flat. Alternatively, the image formation device can have a form in which the image exit surface of the image formation device is curved in an X-direction, in a Y-direction, or in both the X-direction and the Y-direction, where the X-direction is defined as a direction of the image formation device corresponding to a first direction of an image, and the Y-direction is defined as a direction of the image formation device corresponding to a second direction of the image different from the first direction. Note that an image of the X-direction projected onto the xy-plane is parallel to the x-axis, and an image of the Y-direction projected onto the xy-plane is parallel to the y-axis.

In the display apparatuses of the present disclosure having the various preferable forms and configurations described above (the display apparatus having the first configuration of the present disclosure, a display apparatus having a second configuration of the present disclosure described below, and a display apparatus having a third configuration of the present disclosure described below):

the image formation device has a rectangular outer shape; and wiring extends to the outside from an outer peripheral portion of the image formation device extending in the Y-direction. Here, an example of the wiring can be a flexible printed wiring board (FPC). A connection section provided in the outer peripheral portion of the image formation device may be connected with the wiring using a well-known technique.

Also, the display apparatuses of the present disclosure having the various preferable forms and configurations described above (including the display apparatus having the first configuration of the present disclosure), each image display device can be configured to have an image-formation-device-and-reflecting-mirror-distance adjustment device for adjusting a distance between the image formation device and the reflecting mirror. Note that the display apparatus of the present disclosure having such a configuration is referred to as the "display apparatus having the second configuration of the present disclosure" for the sake of convenience. Here, by providing the image-formation-device-and-reflecting-mirror-distance adjustment device, a difference in vision between each observer, depending on the observer, can be appropriately and easily dealt with, although the device has a simple configuration and structure. Also, the display apparatus having the second configuration of the present disclosure can be configured to further include a display control device for controlling a size of an entire image from the image formation device, depending on the distance between the image formation device and the reflecting mirror. For the distance between the image formation device and the reflecting mirror, the image-formation-device-and-reflecting-mirror-distance adjustment device may be provided with a distance detection device for detecting the distance between the image formation device and the reflecting mirror. The distance detection device may be suitably adapted, depending on the configuration and structure of the image-formation-device-and-reflecting-mirror-distance adjustment device. A size of an entire image can be controlled using a well-known control technique, such as enlarging/reducing a size of an entire image, by performing various signal processes (e.g., decimation or interpolation) on an image signal which is used to form an image in the image formation device.

Also, in the display apparatuses of the present disclosure having the various preferable forms and configurations described above (including the display apparatus having the first configuration of the present disclosure, and the display apparatus having the second configuration of the present disclosure), each image display device can be configured to include an eyeball-and-lens-group-distance adjustment device for adjusting a distance between the lens group and the eyeball of observer. Note that the display apparatus of the present disclosure having such a configuration is referred to as the "display apparatus having the third configuration of the present disclosure" for the sake of convenience. Here, by providing the eyeball-and-lens-group-distance adjustment device, the distance between the eyeball of the observer and the lens group can be can be appropriately and easily adjusted and regulated, although the device has a simple configuration and structure.

Also, in the display apparatuses of the present disclosure having the various preferable forms and configurations described above (including the display apparatus having the first configuration of the present disclosure, the display apparatus having the second configuration of the present disclosure, and the display apparatus having the third configuration of the present disclosure), the image display device can be configured to further include a rotation device for rotating the image formation device about at least one of an X-axis, Y-axis, and Z-axis, where the X-axis is defined as an axis which is parallel to the X-direction, passing through a predetermined point (e.g., an image formation device-optical axis strike point described below) of the image formation device, and the Y-axis is defined as an axis which is parallel to the Y-direction, passing through a predetermined point (e.g., the image formation device-optical axis strike point) of the image formation device. Specifically, such a rotation device can, for example, be a rotation device for rotating the image formation device about the X-axis, a rotation device for rotating the image formation device about the Y-axis, a rotation device for rotating the image formation device about the Z-axis, a rotation device for rotating the image formation device about the X-axis and the Y-axis, a rotation device for rotating the image formation device about the X-axis and the Z-axis, a rotation device for rotating the image formation device about the Y-axis and the Z-axis, or a rotation device for rotating the image formation device about the X-axis, the Y-axis, and the Z-axis. Furthermore, when such a configuration is possessed by the display apparatuses of the present disclosure having the various preferable forms and configurations described above (including the display apparatus having the first configuration of the present disclosure, the display apparatus having the second configuration of the present disclosure, and the display apparatus having the third configuration of the present disclosure), the display apparatuses can be configured to further include a movement device for moving the image formation device in the X-direction with respect to the reflecting mirror. When these preferable configurations are possessed by the display apparatuses of the present disclosure having the various preferable forms and configurations described above (including the display apparatus having the first configuration of the present disclosure, the display apparatus having the second configuration of the present disclosure, and the display apparatus having the third configuration of the present disclosure), the display apparatuses can be configured to further include an inter-image-display-device-distance adjustment device for adjusting a distance between the left-eye image display device and the right-eye image display device. By providing the inter-image-display-device-distance adjustment device, observers having different inter-eyeball distances can be easily dealt with.

Furthermore, the display apparatuses of the present disclosure having the various preferable forms and configurations described above including the display apparatus having the first configuration of the present disclosure, the display apparatus having the second configuration of the present disclosure, and the display apparatus having the third configuration of the present disclosure (these are hereinafter collectively referred to as the "display apparatuses and the like of the present disclosure"), can have a form in which the frame is mounted on the observer's head. Note that the present disclosure is not limited to such a form. For example, the frame may be attached to an arm extending from a ceiling or wall, or may be attached to a freely-movable robot arm. Also, a motion of the observer's head may be detected using a sensor, and a motion of the frame may be caused to follow the motion of the observer's head.

In the case of the form in which the frame is mounted on the observer's head, the frame can be of any type if the frame has a configuration and structure which allow the frame to be attached to the observer's head, and in addition, allow the image display device to be attached to the frame. For example, the frame can be configured to include a front section which is to be located in front of the observer, and a side section extending from either end of the front section. The image display device is attached to the frame. Specifically, for example, the image display device is attached to a holding member which is attached to a lower portion of the front section, extending in a generally horizontal direction. Also, a forehead pad which is made contact with the observer's forehead is desirably attached to an upper portion of the front section, in order to improve the observer's feeling of attachment of the image display device.

Furthermore, in the display apparatuses of the present disclosure having the various preferable forms and configurations described above and the like, an overlap (binocular angle of view) between the horizontal field of view of the left-eye image display device and the horizontal field of view of the right-eye image display device can, for example, be 45 degrees to 100 degrees.

Furthermore, in the display apparatuses of the present disclosure having the various preferable forms and configurations described above and the like, the image formation device can be of any type. The image formation device can, for example be: an image formation device including a reflective spatial light modulation device and a light source; an image formation device including a transmissive spatial light modulation device and a light source; or an image formation device including a light emitting device, such as a light emitting diode (LED), semiconductor laser device, organic electroluminescence (EL) device, inorganic EL device, or the like. The spatial light modulation device can, for example, be a light bulb, a transmissive or reflective liquid crystal display device, such as liquid crystal on silicon (LCOS) or the like, or a digital micromirror device (DMD). The light source can, for example, be the above light emitting device. The reflective spatial light modulation device can, for example, be configured to include a liquid crystal display device, and a polarizing beam splitter which reflects a portion of light from the light source and guides the portion of light to the liquid crystal display device, and transmits a portion of light reflected by the liquid crystal display device and guides the portion of light to the optical system. The light emitting device included in the light source can, for example, be a red light emitting device, green light emitting device, blue light emitting device, or white light emitting device. Alternatively, red light, green light, and blue light emitted from a red light emitting device, green light emitting device, and blue light emitting device may be mixed, and their luminances may be homogenized, using light pipes, to obtain white light. Also, such a light emitting device can, for example, be a semiconductor laser device, solid-state laser, or LED.

Alternatively, the image formation device can have a form in which it includes a light source and a scanning means for scanning parallel rays emitted from the light source. Here, the light source can be a light emitting device. Specifically, the light source can be a red light emitting device, green light emitting device, blue light emitting device, or white light emitting device. Alternatively, red light, green light, and blue light emitted from a red light emitting device, green light emitting device, and blue light emitting device may be mixed, and their luminances may be homogenized, using light pipes, to obtain white light. Such a light emitting device can, for example, be a semiconductor laser device, solid-state laser, or LED. When a color image is displayed, and the light source includes a red light emitting device, a green light emitting device, and a blue light emitting device, a color is preferably synthesized using, for example, a cross prism. The scanning means can be a microelectromechanical system (MEMS) or galvano-mirror which horizontally and vertically scans light emitted from the light source, and has, for example, a micromirror which can be rotated in a two-dimensional direction.

In the display apparatuses and the like of the present disclosure, a display region of the image formation device has a length Lx of 83 mm to 130 mm in the X-direction. The number of pixels in the image formation device can, for example, be 320×240, 432×240, 640×480, 1024×768, 1920×1080, 3840×2160, or the like, and the aspect ratio thereof can, for example, be 4:3, 16:9, or alternatively, 21:9 or the like. The horizontal angle of view (monocular angle of view) of the image display device can, for example, be 100 degrees to 120 degrees.

Example 1

Figure 1B:
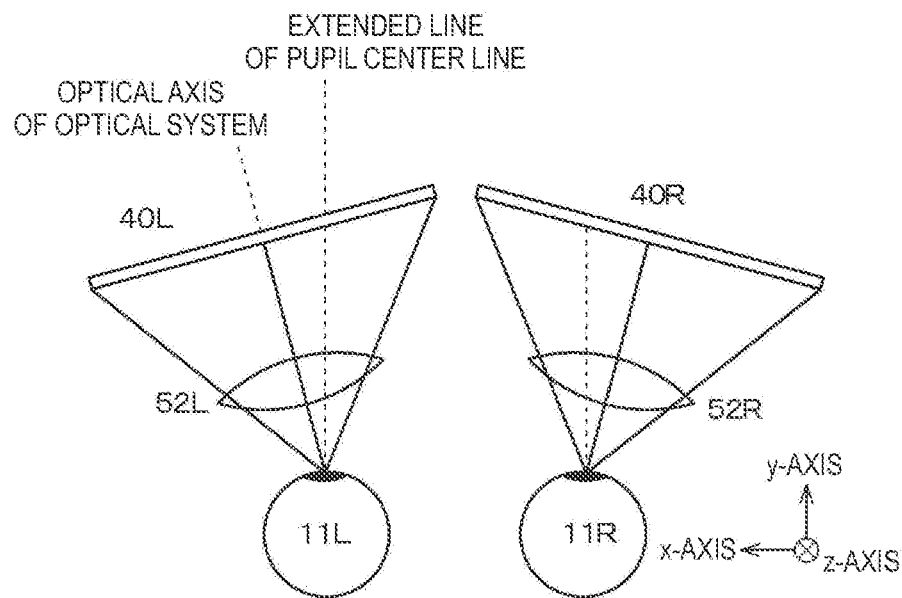
Figure 2:
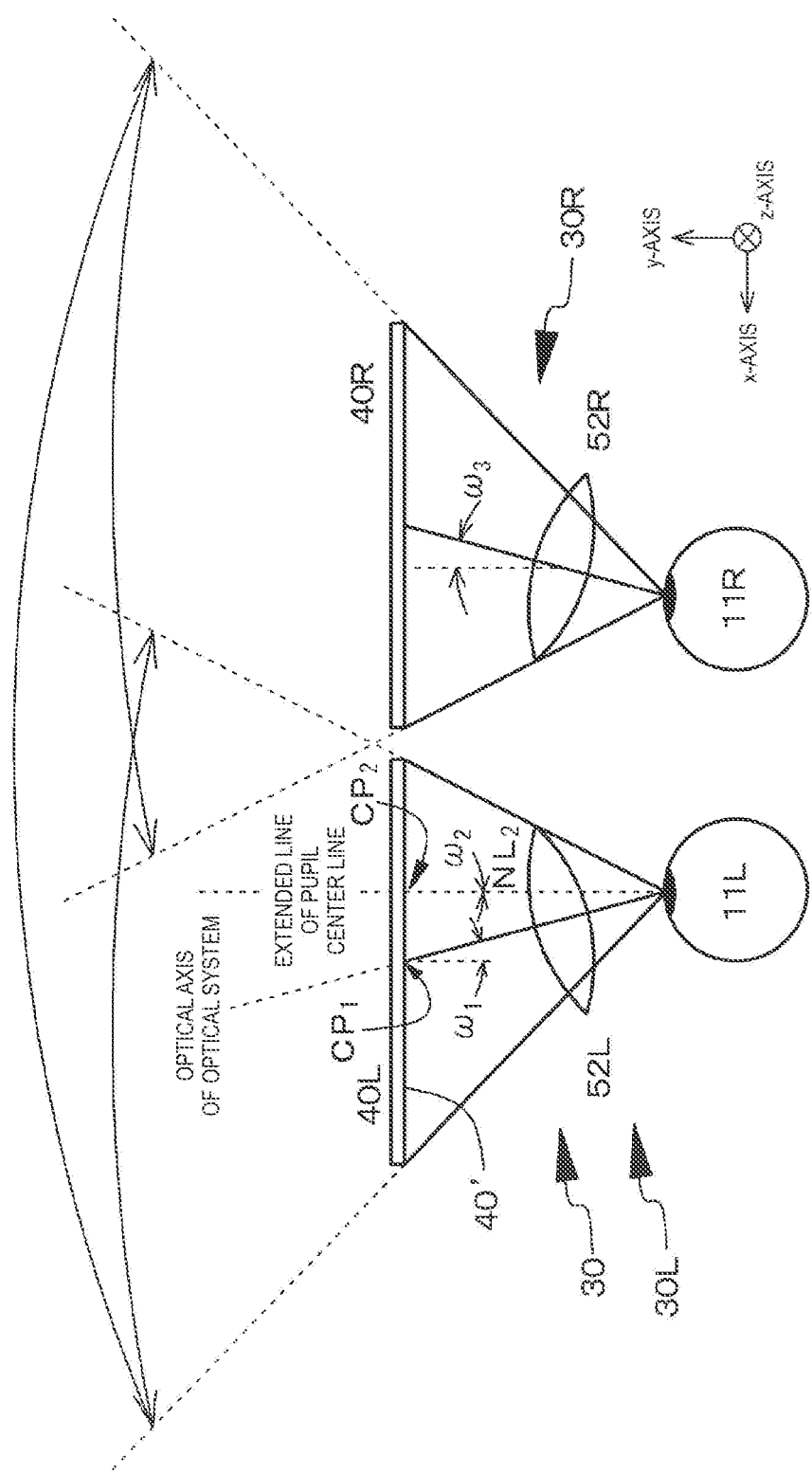
FIG. 2 is a conceptual diagram of a display apparatus and image display device of Example 1.
Figure 5:
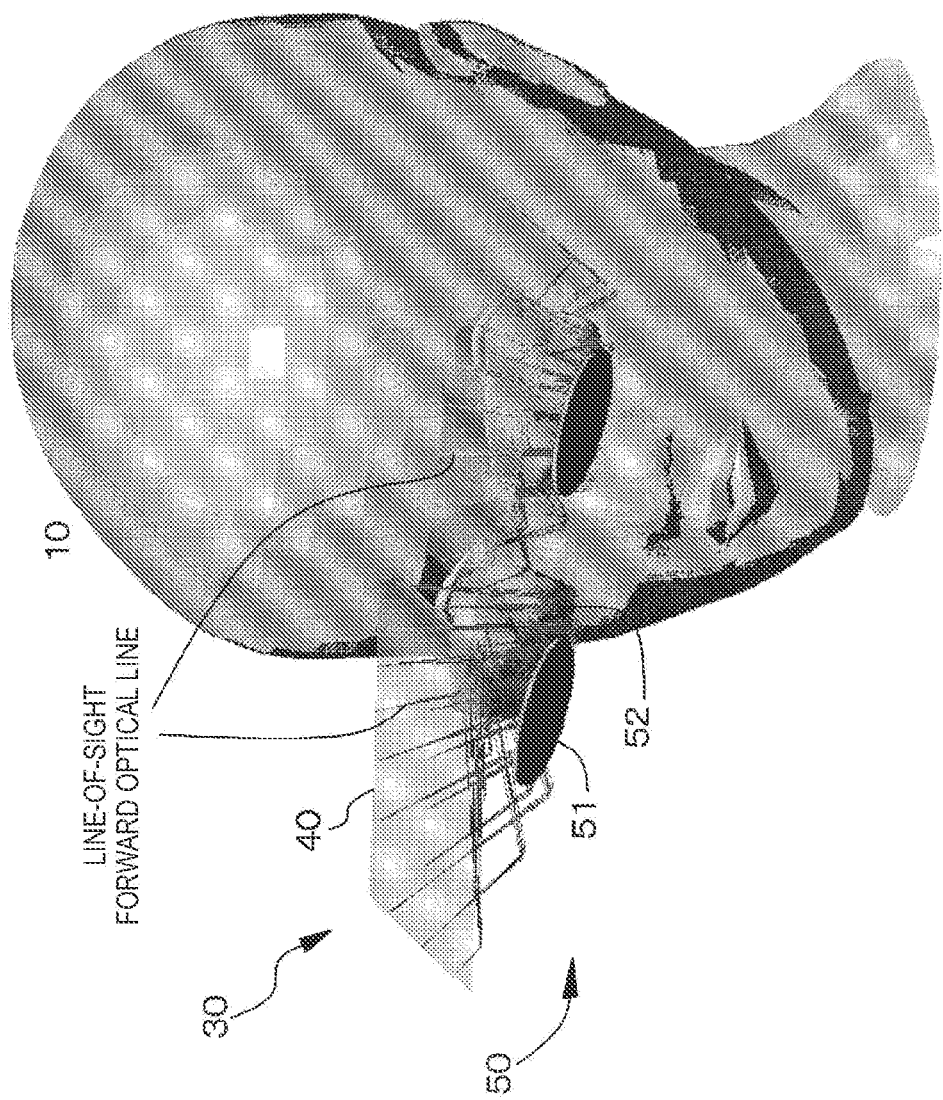
FIG. 5 is a perspective view of main portions of a display apparatus of Example 1 as it is worn by an observer.
Figure 6:
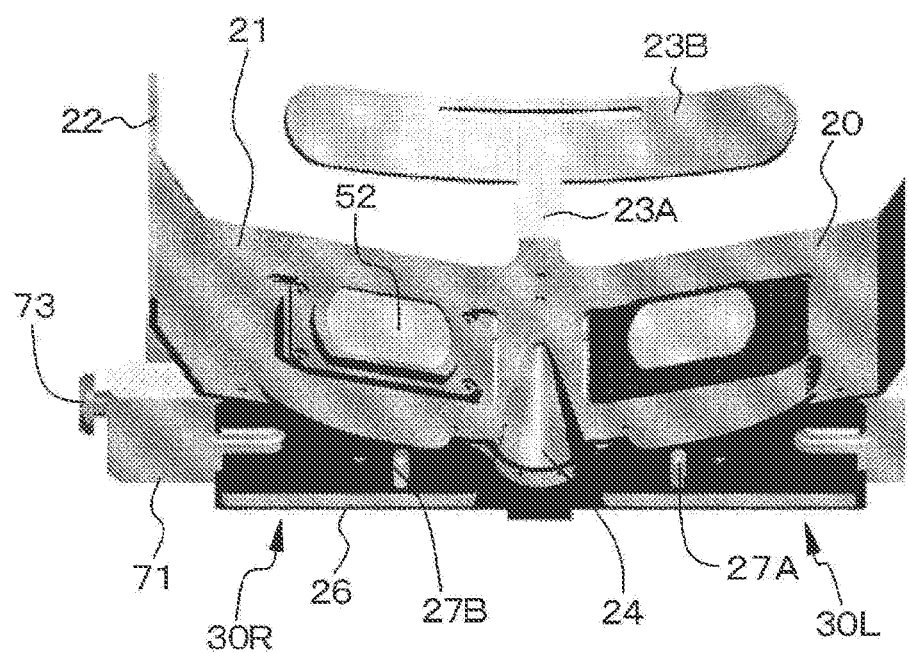
FIG. 6 is a perspective view of a portion of a display apparatus of Example 1.
Figure 7A:
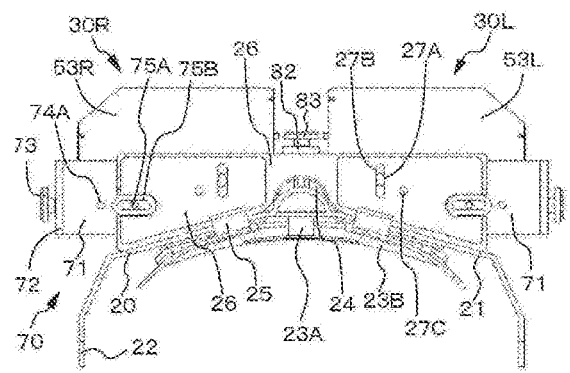
FIG. 7A, FIG. 7B, FIG. 7C, and FIG. 7D are a bottom view, top view, right side view, and rear view, respectively, of a display apparatus of Example 1.
Figure 7B:
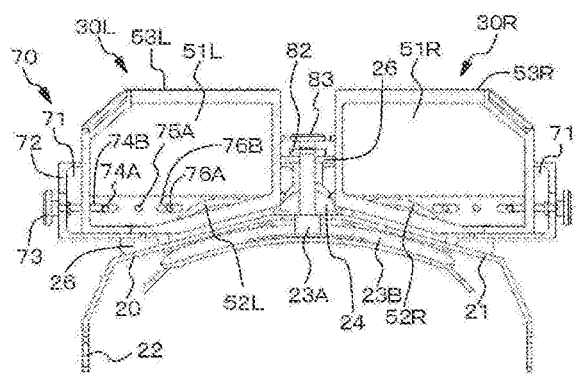
Figure 7C:
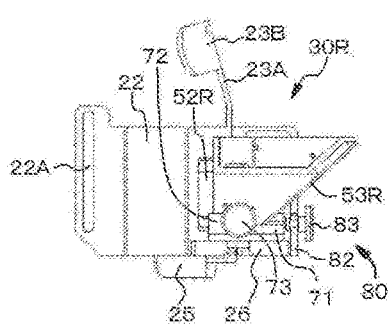
Figure 7D:
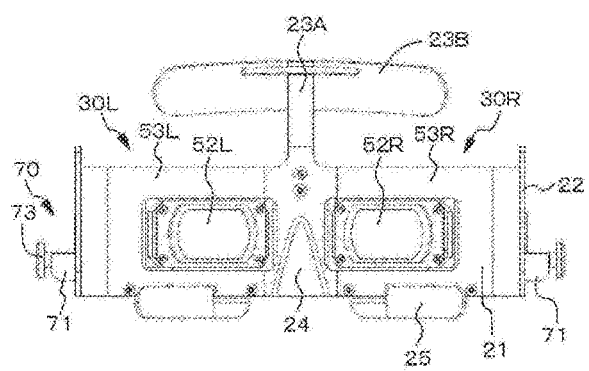

Example 1 relates to the display apparatus and image display device of the present disclosure, and further, to the display apparatus having the third configuration of the present disclosure. FIG. 1A, FIG. 1B, and FIG. 2 show conceptual diagrams of general configurations of the display apparatus and image display device of Example 1 (diagrams of the image display device as viewed from above). Also, FIG. 5 shows a perspective view of main portions of the display apparatus as it is worn by the observer. Furthermore, FIG. 6 shows a perspective view of a portion of the display apparatus of Example 1. In FIG. 6, the reflecting mirror, the image formation device, and the like are not shown. Also, FIG. 7A, FIG. 7B, FIG. 7C, and FIG. 7D show a bottom view, top view, right side view, and rear view of the display apparatus of Example 1, where a portion of the constituent elements of the image formation device and the display apparatus are not shown for sake of simplicity.

The image display device 30 (30L, 30R) of Example 1 includes:

(A) an image formation device 40 (40L, 40R); and
(B) an optical system 50 for bringing an image from the image formation device 40 (40L, 40R) to an eyeball 11 (11L, 11R) of an observer 10,
in which $$0 \text{ (degrees)} \leq \omega_2 < \omega_1$$

is satisfied where
an image-formation-device first strike point $CP_1$ is defined as a point where an extended line of the optical axis of the optical system 50 intersects with an image exit surface 40' of the image formation device 40 (40L, 40R),
a first normal line $NL_1$ is defined as a normal line to the image exit surface 40' of the image formation device 40 (40L, 40R) passing through the image-formation-device first strike point $CP_1$,
an image-formation-device second strike point $CP_2$ is defined as a point where an extended line of the pupil center line of the eyeball of the observer 10 intersects with the image exit surface 40' of the image formation device 40 (40L, 40R),
a second normal line $NL_2$ is defined as a normal line to the image exit surface 40' of the image formation device 40 (40L, 40R) passing through the image-formation-device second strike point $CP_2$, and
$\omega_1$ represents an angle between the extended line of the optical axis of the optical system 50 and the first normal line $NL_1$, and $\omega_2$ represents an angle between the extended line of the pupil center line of the eyeball of the observer 10 and second normal line $NL_2$.

The display apparatus of Example 1 includes:
(i) a frame 20; and
(ii) an image display device attached to the frame 20,
in which
the image display device includes the image display devices 30 (30L, 30R) of Example 1. The frame 20 of the display apparatus of Example 1 is worn on the head of the observer 10. More particularly, the display apparatus of Example 1 is a head mounted display (HMD) and a binocular display apparatus. Note that constituent elements of the left-eye image display device are each indicated by a reference sign with a suffix "L," and constituent elements of the right-eye image display device are each indicated by a reference sign with a suffix "R."

Here, $\omega_2$ satisfies:

$$0 \text{ (degrees)} \leq \omega_2 \leq 1 \text{ (degrees)}$$

Specifically,
$\omega_1 = 15$ (degrees)
$\omega_2 = 0$ (degrees)
$\theta_1 = 45$ degrees
$\theta_2 = 10$ degrees The image display device 30 further includes a reflecting mirror 51 for reflecting an image from the image formation device 40. The optical system 50 includes lens group 52. The lens group 52 is located (inserted) between the eyeball 11 of the observer 10 and the reflecting mirror. An image reflected by the reflecting mirror 51 including a plane mirror enters the lens group 52. The optical axis of the lens group 52 corresponds to the optical axis of the optical system 50. Furthermore, a point where the optical axis of the optical system 50 intersects with a surface of the lens group 52 facing the observer 10, is located closer to the outside than is the pupil center line of the eyeball of the observer 10. When an angle between an image of the optical axis of the optical system 50 which is projected onto the horizontal surface (xy-plane) and an image of the pupil center line of the eyeball of the observer 10 which is projected onto the horizontal surface (xy-plane) is represented by $\omega_3$, $0<\omega_3$ is satisfied. A specific example was:

$$\omega_3 = \theta_3 = 15 \text{ (degrees)}$$

Note that $\omega_1$ and $\omega_3$ satisfies the following relationship:

$$0 \text{ (degrees)} \leq |\omega_1 - \omega_3| \leq 1 \text{ (degrees)}$$

Incidentally, when the size of a pixel in the image formation device is substantially the same, it is effective to increase the size of the image formation device if a larger screen is desired. When, in the binocular display apparatus, the extended line (line-of-sight forward optical line) of the pupil center line of the eyeball 11 of the observer 10 is located orthogonal to the image exit surface 40' of the image formation device 40L, 40R, the increase in the size of the image formation device is accompanied by overlapping of the image formation device 40L and the image formation device 40R, which makes it difficult to arrange the image formation devices 40L and 40R. This situation is shown in FIG. 1A which is a conceptual diagram of the image display device and the like as viewed from above. Here, it is contemplated that the lens groups 52L and 52R and the image formation devices 40L and 40R are inclined. This situation is shown in FIG. 1B which is a conceptual diagram of the image display device and the like as viewed from above. Such an arrangement can provide a field of view which is similar to that of a human eye, and enlarge the entire field of view. However, in such an arrangement, the pupil center line (line-of-sight forward optical line) of the eyeball of the observer is not orthogonal to the image exit surface 40' of the image formation device 40 (40L, 40R), and therefore, when a position of the image display device in the eyeball direction (x-axis direction) of the observer 10 is adjusted, an observed image is distorted (see FIG. 14B). Note that, in FIG. 1A, FIG. 1B, and FIG. 2, and FIG. 3 described below, the reflecting mirror is not shown. Also, although the image formation device is shown in a vertical position, the image formation device is actually in substantially a horizontal position.

Figure 14A:
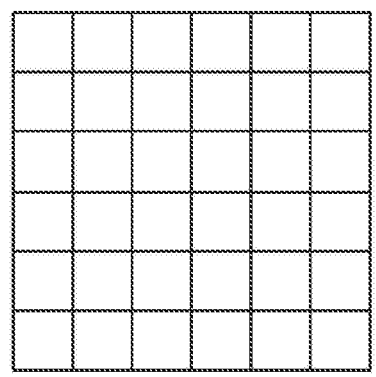
FIG. 14A and FIG. 14B are diagrams schematically showing what image is observed in a conventional virtual-image display apparatus.
Figure 14B:
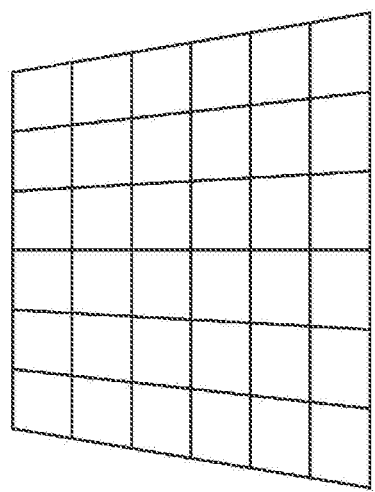

Meanwhile, in the display apparatus and image display device of Example 1, as can be seen from FIG. 2 which is a conceptual diagram of the image display device and the like as viewed from above, the angle $\omega_1$ between the extended line of the optical axis of the optical system 50 and the first normal line, and the angle $\omega_2$ between the extended line of the pupil center line of the eyeball of the observer 10 and the second normal line, satisfy the predetermined relationship. Specifically, the extended line (line-of-sight forward optical line) of the pupil center line of the eyeball 11 of the observer 10 is substantially orthogonal to the image exit surface 40' of the image formation device 40. Therefore, when the position of the image display device in the eyeball direction (x-axis direction) of the observer 10 is adjusted, an image observed by the observer 10 only translates in a direction substantially orthogonal to the extended line of the pupil center line (line-of-sight forward optical line), and therefore, the observed image is less likely to be distorted. In addition, the resolution can be improved in a most frequent position of the eyeball (in front of the eye along the line of sight), and therefore, an object to be observed can be seen in a more realistic way, and images captured by both eyes can be more easily fused. Furthermore, image distortion characteristics are flat in front of the eye along the line of sight, and therefore, when the eyeball is turned, a difference in image distortion characteristics (may also be hereinafter referred to as "image distortion characteristics difference") is less likely to occur between the left-eye image display device and the right-eye image display device. Also, a distorted image as shown in FIG. 14B can be prevented, and therefore, it is not necessary to correct an input image signal in order to correct a distorted image as shown in FIG. 14B.

Figure 4A:
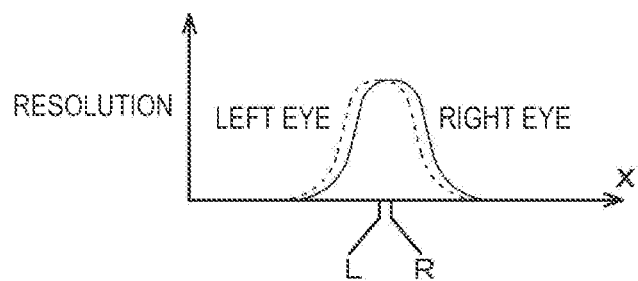
FIG. 4A, FIG. 4B, and FIG. 4C are diagrams schematically showing relative positions and resolutions of an image viewed by each of the right eye and the left eye in a display apparatus of Example 1, a display apparatus of Example 2, and a conventional display apparatus.
Figure 4B:
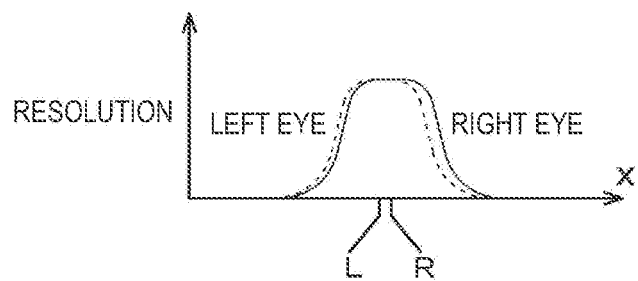
Figure 4C:
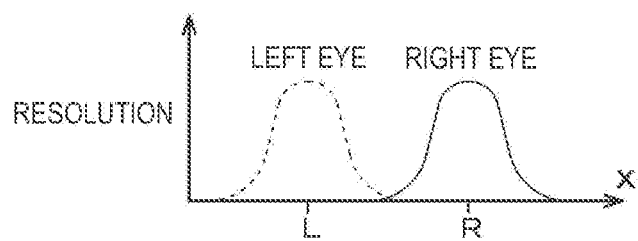

FIG. 4A, FIG. 4B, and FIG. 4C schematically show positions in the x-axis direction and resolutions of an image viewed by each of the right eye and the left eye in the display apparatus of Example 1, a display apparatus of Example 2, and a conventional display apparatus. Note that, in FIG. 4A, FIG. 4B, and FIG. 4C, "L" indicates a position on the x-axis where the highest resolution can be obtained in an image viewed by the left eye, and "R" indicates a position on the x-axis where the highest resolution can be obtained in an image viewed by the right eye. Here, the conventional apparatus is a display apparatus (see FIG. 1B) which satisfies:

$$0 \text{ (degrees)} = \omega_1 < \omega_2 = 15 \text{ (degrees)}$$

The conventional apparatus is an example in a case where the position adjustment of the image display device in the eyeball direction (x-axis direction) of the observer (specifically, the adjustment of a relative position between the two image display devices in the eyeball direction of the observer on the basis of the inter-eyeball distance of the observer) is not most suitable.

In the conventional display apparatus, an image viewed by the right eye is separated from an image viewed by the left eye in the x-axis direction, and as a result of fusion of the images, the images are recognized as double images (see FIG. 40). Meanwhile, in the display apparatus of Example 1, an image viewed by the right eye coincides with an image viewed by the left eye in the x-axis direction, and as a result of fusion of the images, the images are recognized as a single image (see FIG. 4A). Note that, in the display apparatus of Example 2 described below, a range having a high resolution in the x-axis direction is wider than in the display apparatus of Example 1. In other words, in the display apparatus of Example 2, the image distortion characteristics are flatter in front of the eye along the line of sight, and therefore, a difference in image distortion characteristics is less likely to occur when the eyeball is turned.

Specifically, in the display apparatus of Example 1, the image formation device 40 includes a liquid crystal display device having a well-known configuration and structure. The liquid crystal display device includes a first substrate, a second substrate, and a large number of light emitting units interposed between the first substrate and the second substrate. The number of pixels of the image formation device 40 was 1920×1080. The horizontal angle of view (monocular angle of view) of each image display device 30 (30L, 30R) was 100 degrees. The overlap (binocular angle of view) between the horizontal field of view of the left-eye image display device 30L and the horizontal field of view of the right-eye image display device 30R was 70 degrees. The overall horizontal angle of view was 130 degrees. The length Lx in the X-direction of the display region of each image formation device 40 was 100 mm. Also, the vertical angle of view was 60 degrees.

Also, wiring, specifically a flexible printed wiring board (FPC), extends to the outside from an outer peripheral portion of the image formation device 40 extending in the Y-direction. A connection section provided in the outer peripheral portion of the image formation device may be connected with the wiring using a well-known technique.

The frame 20, which is worn on the head of the observer 10, is made of plastic, and includes a front section 21 provided in front of the observer 10, and a side section 22 extending from either end of the front section. A hole section 22A is provided at a rear end portion of each side section 22. A belt is passed through the hole sections 22A, and is fasten at a rear portion of the observer's head, whereby the frame 20 can be worn on the head of the observer 10. An arm 23A extends upward from an upper portion of the front section 21. A forehead pad 23B which is made contact with the forehead of the observer 10 is attached to a tip portion of the arm 23A. Furthermore, the front section 21 is provided with a nose pad section 24. Also, a rear portion of the holding member 25 is attached to a lower end portion of the front section 21. A base 26 is attached to a front portion of the holding member 25. Furthermore, an eyeball-and-lens-group-distance adjustment device 80 described below is attached to a tip portion of the base 26. A seat 71 included in the eyeball-and-lens group-distance adjustment device 80 is provided on the base 26 so that the seat 71 can freely slide forward and backward. The optical system 50L included in the left-eye image display device 30L is accommodated in a housing 53L. The optical system 50R included in the right-eye image display device 30R is accommodated in a housing 53R. The left-eye image display device 30L is attached to the housing 53L. The left-eye image display device 30R is attached to the housing 53R. The housing 53L and the housing 53R are attached to the seat 71. As described next, a pair of the optical system 50L and the left-eye image display device 30L and a pair of the optical system 50R and the right-eye image display device 30R are arranged so that each pair can independently freely slide leftward and rightward on the seat 71. Note that the term "forward and backward" means directions in which the lens group moves toward and away from the eyeball. The term "leftward and rightward" means directions in which the left-eye image display device and the right-eye image display device move toward or away from each other.

As described above, the optical system 50 includes the lens group 52 which an image reflected by the reflecting mirror 51 enters. The reflecting mirror 51R and the lens group 52R included in the right-eye image display device are attached to the seat 71 with the housing 53R being interposed therebetween, and can slide leftward and rightward on the base 26. Similarly, the reflecting mirror 51L and the lens group 52L included in the left-eye image display device are attached to the seat 71 with the housing 53L being interposed therebetween, and can slide leftward and rightward on the base 26. The lens groups 52 (52R, 52L) are located between the eyeball 11 of the observer 10 and the reflecting mirror 51 (51R, 51L). The image formation device 40 is located above the reflecting mirror 51.

The lens group 52 includes a group of three lenses. The first lens (lens closest to the observer) is a spherical lens having positive power, the second lens is a meniscus lens having negative power, and the third lens (closest to the reflecting mirror) is a freeform surface lens having positive power. Also, a material for the second lens has a higher refractive index than those of materials for the first lens and the third lens. The lens group 52 had a length of 50 mm in the horizontal direction, and a length of 30 mm in the vertical direction. Here, a distance between the first lens and the eyeball (pupil diameter: 4 mm) of the observer 10 was 12 mm, the effective focal point distance was 66.1 mm, the rear focal point distance was 7.13 mm, and the front focal point distance was 26.5 mm. Such a lens configuration allows a single eye to have a horizontal angle of view of 100 degrees and a vertical angle of view of 60 degrees.

The display apparatus of Example 1 further includes an inter-image-display-device-distance adjustment device 70 for adjusting a distance between the left-eye image display device 30L and the right-eye image display device 30R, although this is not essential. Specifically, the inter-image-display-device-distance adjustment device 70 includes the seat 71, a feed screw mechanism 73 attached to a side surface 72 located outside the seat 71, a tapped hole 75A for fixing the housing 53 to the seat 71 from bottom by a holding force which allows the housing 53 to slide, guide grooves 74B and 76B provided in the housing 53, a guide groove 75B provided in the seat 71, and pins 74A and 76A provided on the seat 71 and engaging with the guide grooves 74B and 76B. Note that the guide grooves 75B, 75B, and 76B extend in a lateral direction. When the feed screw mechanism 73 is rotated, the housing 53 (the housing 53L or the housing 53R) moves leftward or rightward with respect to the base 26. The leftward and rightward movements of the housing 53 are reliably performed by the engagement of the pin 74A, the tapped hole 75A, and the pin 76A with the guide grooves 74B, 75B, and 76B. The movement distance of the housing 53L, 53R in the horizontal direction was ±5 mm. Thus, by providing the inter-image-display-device-distance adjustment device 70, it is easy to deal with observers having different inter-eyeball distances. Instead of the feed screw mechanism 73, a combination of a latch mechanism and a nob, or a rack-and-pinion mechanism, can be used. The housing 53R, 53L extends upward further than it is shown in FIG. 7A, FIG. 7B, FIG. 7C, and FIG. 7D. To this portion of the housing 53R, 53L extending upward, a support member for supporting the image formation device 40 and the like are attached, but are not shown.

Also, the display apparatus of Example 1 further includes an eyeball-and-lens-group-distance adjustment device 80 between the eyeball of the observer 10 and the lens group 52, although this is not essential. Specifically, the eyeball-and-lens-group-distance adjustment device 80 adjusts a distance between the lens group 52 and the eyeball of the observer 10. More specifically, the eyeball-and-lens-group-distance adjustment device 80 includes a side wall 82 attached to a tip portion of the holding member 25, a feed screw mechanism 83 attached to the side wall 82, a key 27A provided on the seat 71, extending downward from the seat 71, a guide groove 27B provided in the base 26, engaging the key 27A, and a fastening section 27C for holding the seat 71 at a level which allows the seat 71 to slide with respect to the base 26. When the feed screw mechanism 83 is rotated, the seat 71 moves forward or backward with respect to the base 26. The leftward and rightward movements of the seat 71 are reliably performed by the engagement of the key 27A with the guide groove 27B. The forward and backward movement distances of the seat 71 were ±4 mm. Thus, by providing the eyeball-and-lens-group-distance adjustment device 80, it is easy to deal with observers having different distances between the eyeball and the lens group. Therefore, a display apparatus can be provided in which the distance between the eyeball of the observer and the lens group can be appropriately and easily adjusted and regulated, although it has a simple configuration and structure. Instead of the feed screw mechanism 83, a combination of a latch mechanism and a nob, or a rack-and-pinion mechanism, can be used.

Example 2

Figure 3:
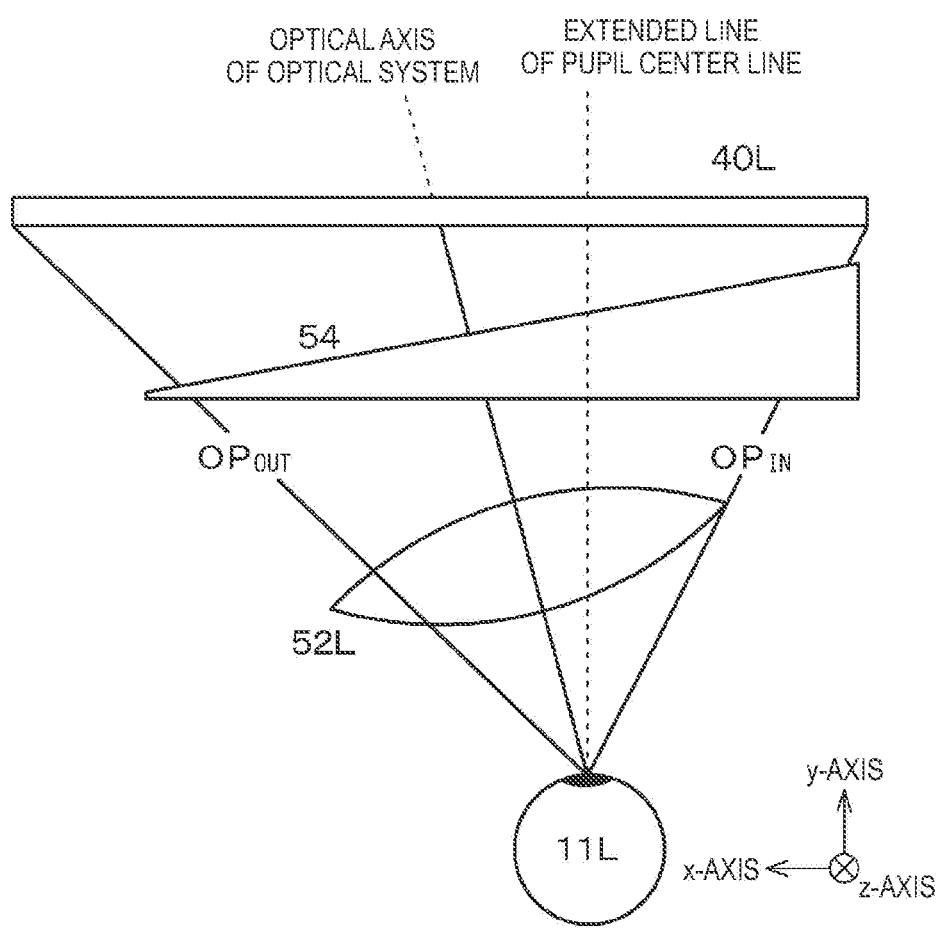
FIG. 3 is a conceptual diagram of a display apparatus and image display device of Example 2.

Example 2 is a variation of Example 1. As shown in FIG. 3 which is a conceptual diagram of an image display device and the like as viewed from above, a display apparatus or image display device of Example 2 has an optical member 54 having a freeform surface which is located (inserted) between the reflecting mirror 51 and the lens group 52 (or the optical system 50). Here, specifically, as the optical member 54, a prism-shaped member was used. A thickness in the light transmission direction of the optical member 54 changes in the horizontal direction (xy-plane) from the inside (closer to the nose of the observer 10) toward the outside. Specifically, the thickness becomes smaller from the inside toward the outside. The freeform surface (surface along the xz-plane) of the optical member 54 has an odd-order surface in the horizontal direction (xy-plane). Specifically, in a polynominal of x, the coefficient of the first-order term of x is "0," and the coefficients of the second-order and higher terms of x are not zero. Also, in a polynominal of z of a surface, the coefficients of the odd-order terms of z are "0," and the coefficients of the even-order terms of z are not zero. By thus inserting the optical member 54, variations in optical distance (optical path lengths) between various points on the image exit surface 40' of the image formation device 40 and the eyeball 11 of the observer 10 can be reduced, so that the distortion of an image can be further reduced, and the upper and lower fields of view can be enlarged. Also, images captured by the two eyes can be more easily fused, and the image distortion characteristics are flat in front of the eye along the line of sight, and therefore, when the eyeball is turned, a difference in image distortion characteristics is even less likely to occur. Note that it is preferable to perform a kind of weighting using a turned state of the eyeball as a parameter, and design the freeform surface.

Alternatively, the reflecting mirror 51 can have a form in which it has a freeform surface. Alternatively, the reflecting mirror 51 can have a form in which it has a concave surface. When the reflecting mirror have these forms, variations in optical distance (optical path lengths) between various points on the image exit surface 40' of the image formation device 40 and the eyeball 11 of the observer 10 can be reduced. Note that when the reflecting mirror 51 has a form in which it has a concave surface, rays located at a peripheral portion of the field of view can be caused to reliably reach the eyeball of the observer, and it is no longer necessary to unnecessarily increase the size of the image display device in order to enlarge the field of view. The reflecting mirror 51 having a freeform surface and the optical member 54 having a freeform surface may be provided.

Example 3

Example 3 is a variation of Example 1 and Example 2, and relates to the display apparatus having the first configuration of the present disclosure. FIG. 8 shows a perspective view of main portions of a display apparatus of Example 3 as it is worn by the observer.

In the display apparatus or image display device of Example 3, a normal line $NL_R$ to the reflecting mirror 51 included in the left-eye image display device 30R intersects with a normal line $NL_L$ to the reflecting mirror 51 included in right-eye image display device 30R in a space on the opposite side of the reflecting mirrors 51 from the observer 10. Furthermore, the normal line $NL_L$ to the reflecting mirror 51 in the left-eye image display device 30L intersects with the normal line $NL_R$ to the reflecting mirror 51 in the right-eye image display device 30 below the virtual surface (xy-plane) including both eyeballs 11 of the observer 10 and a point at infinity. The image formation device 40 is located above the reflecting mirror 51. The reflecting mirror 51 is located as shown in FIG. 11, FIG. 12A, and FIG. 12B. Specifically, in Example 1, the length Lx of the display region of the image formation device 40 was 100 mm, and $\omega_1$=15 degrees
$\omega_2$=0 degrees
$\theta_1$=45 degrees
$\theta_2$=10 degrees
$\theta_3$=$\omega_3$=15 degrees Note that, in the example, the reflecting mirror optical axis strike point is included in the xy-plane. Under such setting conditions, there is a gap of about 15 mm between the image formation device 40 included in the left-eye image display device 30L and the image formation device 40 included in the right-eye image display device 30R, and the two image formation devices can be arranged side by side. Also, the length Lx of the display region of the image formation device 40 may be 126 mm, and $\omega_1$=25 degrees
$\omega_2$=0 degrees
$\theta_1$=45 degrees
$\theta_2$=18 degrees
$\theta_3$=$\omega_3$=25 degrees In this case, there is a gap of about 15 mm between the image formation device 40 included in the left-eye image display device 30L and the image formation device 40 included in the right-eye image display device 30R, and the two image formation devices can be arranged side by side.

By employing such a form, the two image formation devices 40 can be easily arranged side by side with a high flexibility of design.

In a case where (see FIG. 1A):
$\omega_1$=0 degrees
$\omega_2$=0 degrees
$\theta_1$=45 degrees
$\theta_2$=0 degrees
$\theta_3$=$\omega_3$=0 degrees
and the length Lx in the X-direction of the display region of the image formation device 40 is 100 mm, and the distance between the pupil center line of the left eye of the observer and the pupil center line of the right eye of the observer is 65 mm, the image formation device 40 included in the left-eye image display device 30L and the image formation device 40 included in the right-eye image display device 30R overlap by about 35 mm [=50+50−65 (mm)]. The image formation devices cannot be arranged side by side.

Example 4

Example 4 is a variation of Example 1 to Example 3, and relates to the display apparatus having the second configuration of the present disclosure. In a display apparatus of Example 4, each image display device 30 further includes an image-formation-device-and-reflecting-mirror-distance adjustment device 90 for adjusting a distance between the image formation device 40 and the reflecting mirror 51.

Figure 10A:
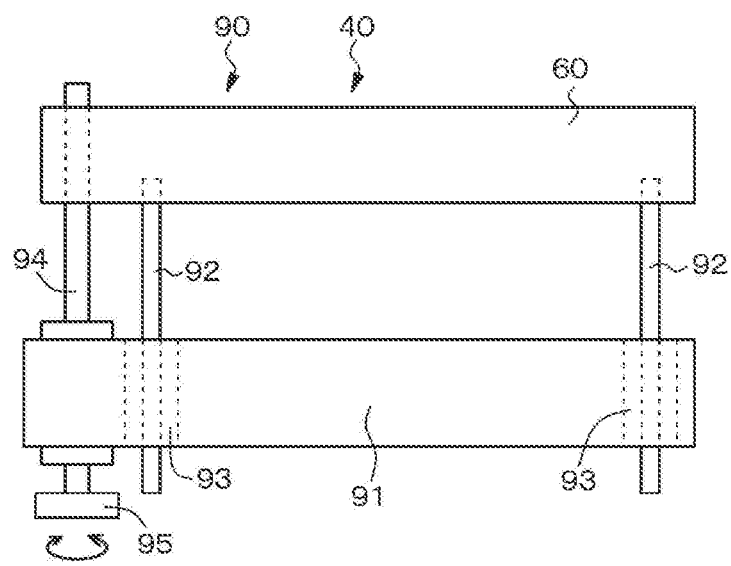
FIG. 10A and FIG. 10B are schematic diagrams of an image-formation-device-and-reflecting-mirror-distance adjustment device.

As described above, a support member or the like for supporting the image formation device 40 is attached to the portion of the housing 53R, 53L extending upward. As shown in FIG. 10A, for example, the image-formation-device-and-reflecting-mirror-distance adjustment device 90 includes an adjustment device base member 91, a shaft 92 attached to a support member 60, a feed screw mechanism 95 attached to the adjustment device base member 91, and a shaft 94 extending from the feed screw mechanism 95 and attached to the support member 60. The support member 60 allows the shaft 92 to freely slide by means of a bushing 93, and can thereby freely change a distance between the support member 60 and the adjustment device base member 91. The adjustment device base member 91 is attached to the portion of the housing 53R, 53L extending upward. By rotating the feed screw mechanism 95, the shaft 94 is moved in the vertical direction in the figure, so that the distance between the adjustment device base member 91 and the support member 60 can be changed. The movement of the support member 60 in the vertical direction in the figure is limited by the shaft 92 with the bushing 93.

Figure 10B:
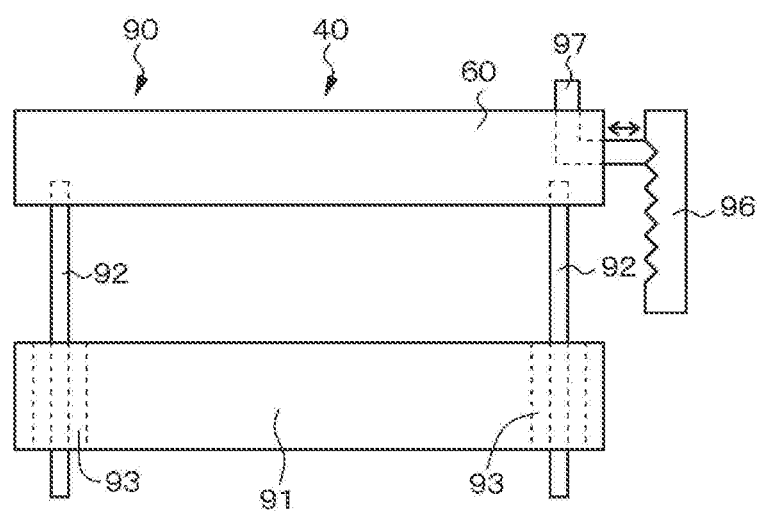

Alternatively, as shown in FIG. 10B, for example, the image-formation-device-and-reflecting-mirror-distance adjustment device 90 includes a latch mechanism 96, and a pin 97 engaging with the latch mechanism. When the pin 97 is moved leftward in the figure (see an arrow in FIG. 10B), the pin 97 is disengaged from the latch mechanism 96. When the pin 97 is moved rightward in the figure after the support member 60 is moved in the vertical direction in the figure, the pin 97 engages with the latch mechanism 96.

Thus, by using the image-formation-device-and-reflecting-mirror-distance adjustment device 90 shown in FIG. 10A or FIG. 10B, the distance between the image formation device 40 and the reflecting mirror 51 can be adjusted and regulated according to the observer's vision. Note that the image-formation-device-and-reflecting-mirror-distance adjustment device 90 shown in FIG. 10A or FIG. 10B is merely illustrative, and may be of any type that can adjust the distance between the image formation device and the optical system. For example, instead of the bushing 93, a linear guide rail can be used, or a constraint mechanism between two planes arranged at right angles can be used. Also, instead of the feed screw mechanism 95 or the latch mechanism 96, a rack-and-pinion mechanism may be employed.

For the distance between the image formation device 40 and the reflecting mirror 51, the image-formation-device-and-reflecting-mirror-distance adjustment device 90 may be provided with a distance detection device for detecting the distance between the image formation device 40 and the reflecting mirror 51. The distance detection device may be appropriately adapted, depending on the configuration and structure of the image-formation-device-and-reflecting-mirror-distance adjustment device 90. Specifically, for example, the distance detection device may be a device for detecting a position (angle) of the feed screw mechanism 95, or a device for detecting a position of the pin 97 in the latch mechanism 96.

The display apparatus of Example 4 further includes a display control device (not shown) for controlling a size of an entire image from the image formation device 40, depending on the distance between the image formation device 40 and the reflecting mirror 51. Specifically, a size of an entire image from the image formation device 40 is decreased with a decrease in the distance between the image formation device 40 and the reflecting mirror 51. Note that a size of an entire image can be controlled using a well-known control technique, such as enlarging/reducing a size of an entire image, by performing various signal processes on an image signal which is used to form an image in the image formation device 40. The distance between the image formation device 40 and the reflecting mirror 51 may be detected using the above distance detection device.

Figure 9:
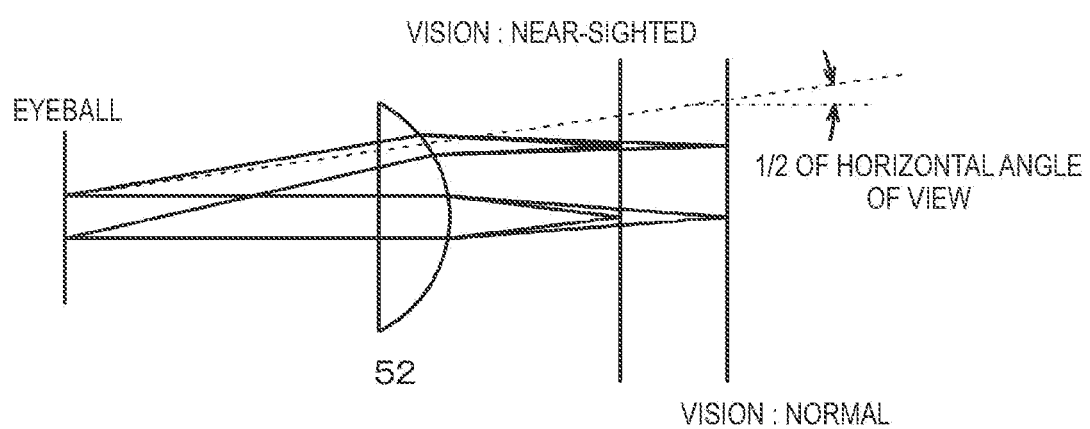
FIG. 9 is a diagram conceptually showing a situation where a distance between an image formation device and an optical system is adjusted using an image-formation-device-and-reflecting-mirror-distance adjustment device.

FIG. 9 conceptually shows a relationship between the amount of a movement of the image formation device 40 with respect to the reflecting mirror 51 and a size of an entire image, i.e., a situation where the distance between the image formation device and the optical system is adjusted using the image-formation-device-and-reflecting-mirror-distance adjustment device. Compared to a case where the observer has a normal vision (diopter value: 0), when the observer is near-sighted, the distance between the image formation device and the optical system is reduced. In this case, as shown in FIG. 9, a size of an entire image from the image formation device 40 may be reduced. A relationship between the diopter value, the amount of a movement of the image formation device, and a size of an entire image (displayed image size) is shown in Table 2 below.

TABLE 2

| Diopter value Movement amount Displayed image size |
|---|
| −3 |
| −9.4 mm |
| 95.5 mm |
| −2 |
| −6.3 mm |
| 9.8 mm |
| −1 |
| −3.1 mm |
| 100.3 mm |
| 0 |
| 0 |
| 103.4 mm |
| 1 |

TABLE 2-continued

Diopter value
Movement amount
Displayed image size

+3.1 mm
106.7 mm
2
+6.3 mm
110.0 mm
3
+9.4 mm
113.8 mm

When the image formation device 40 (more specifically, the support member 60) is attached to the portion of the housing 53R, 53L extending upward, it may be necessary to finely adjust the attachment of the support member 60. Note that it is typically necessary to do such a fine adjustment during assembly of the display apparatus. In such a case, the image display device 30 may be provided with a rotation device for rotating the image formation device 40 about at least one of an X-axis, a Y-axis, and a Z-axis, where the X-axis is defined as an axis which is parallel to the X-direction, passing through a predetermined point (image formation device-optical axis strike point) of the image formation device 40, and the Y-axis is defined as an axis which is parallel to the Y-direction, passing through a predetermined point (image formation device-optical axis strike point) of the image formation device 40. An example of the rotation device can be a combination of a press screw and a pull screw which are attached to the housing 53R, 53L. By finely adjusting the press screw and the pull screw, the attachment of the support member 60 to the portion of the housing 53R, 53L extending upward can be finely adjusted. For example, the image formation device 40 may be rotated about the X-axis by 40 milliradians. The image formation device 40 may be rotated about the Y-axis by 40 milliradians. The image formation device 40 may be rotated about the Z-axis by 40 milliradians. Also, if a guide groove is provided in the portion of the housing 53R, 53L extending upward, and a feed screw mechanism is provided on the support member 60, i.e., a movement device including a guide groove and a feed screw mechanism is provided, the image formation device 40 can be moved in the X-direction with respect to the reflecting mirror 51.

The display apparatus of Example 4 includes the image-formation-device-and-reflecting-mirror-distance adjustment device. Therefore, a display apparatus can be provided which can appropriately and easily deal with a difference in vision between each observer, depending on the observer, although it has a simple configuration and structure.

In the foregoing, the present disclosure has been described on the basis of preferable examples. The present disclosure is not limited to these examples. The configurations and structures of the display apparatus, image display device, and image formation device described in the examples are merely illustrative, and changes and modifications can be made thereto as appropriate. The image formation device and the support member for supporting the image formation device which have been described in the examples can be combined to configure a projector. Also, instead of the reflecting mirror, a beam splitter (also called a partially reflective mirror, a partially transmissive mirror, a semi-transparent mirror, or a half-silvered mirror).

The display apparatus can have a form in which it includes a distortion correction device, and the distortion correction device corrects an input image signal so that a distortion of an image to be observed is corrected. FIG. 13A, FIG. 13B, FIG. 13C, and FIG. 13D show conceptual diagrams for describing what an image to be observed is like in the display apparatus, in the presence or absence of correction of a distortion of an image signal (correction of a display position). When a distortion of an image is not corrected, an image displayed on the image formation device (see FIG. 13O) is finally observed in a form shown in by FIG. 13D by the observer 10. Specifically, a barrel-type distortion occurs in an image observed by the observer 10. Meanwhile, when a distortion of an image is corrected, an image displayed on the image formation device (see FIG. 13A) is finally observed in a form shown in FIG. 13B by the observer 10. Specifically, although a barrel-type distortion occurs in an image observed by the observer 10, a bobbin-type distortion has been originally imparted to the image displayed on the image formation device (see FIG. 13A), and therefore, the observer 10 can finally observe an image free from a distortion (see FIG. 13B). The distortion correction device is provided with a distortion correction coefficient table. The distortion correction coefficient table contains a list of relationships between a position ($X_{Out}$, $Y_{Out}$) of an output image signal on the image formation device and a position correction amount ($\Delta X_{Out}$, $\Delta Y_{Out}$) for the position ($X_{Out}$, $Y_{Out}$). A correspondence relationship between a position on the image formation device and an output image signal is acquired by the distortion correction device. Next, the distortion correction device looks up a position correction amount ($\Delta X_{Out}$, $\Delta Y_{Out}$) corresponding to the acquired position ($X_{Out}$, $Y_{Out}$) on the image formation device in the distortion correction coefficient table using the acquired position ($X_{Out}$, $Y_{Out}$). Thereafter, a value of an image signal corresponding to the corrected position ($X_{Out}+\Delta X_{Out}$, $Y_{Out}+\Delta Y_{Out}$) is calculated from the input image signal by extraction, interpolation, or the like, and the resulting value is displayed as a value at the position ($X_{Out}$, $Y_{Out}$) on the image formation device. The position correction amount ($\Delta X_{Out}$, $\Delta Y_{Out}$) may be previously obtained by various simulations, experiments, or the like. Thereafter, the distortion correction device corrects an input image signal, and thereby corrects a distortion of an image to be observed. The distortion correction device corrects an input image signal to impart a barrel-type distortion or a bobbin-type distortion to the input image signal to be corrected. In other words, the image formation device 40 displays an image having a barrel-type distortion or a bobbin-type distortion. Specifically, the distortion correction device corrects at least image signals corresponding to both ends of the image formation device 40 and portions located in the vicinity thereof, of an input image signal, and thereby corrects at least distortions of an image at both ends of the image formation device 40 and portions located in the vicinity thereof. More specifically, image signals corresponding to both ends of the image formation device 40 and portions located in the vicinity thereof are corrected. Here, the distortion correction device itself can have a well-known circuit configuration, and is included in a control device (not shown) for controlling an operation of the display apparatus.

Additionally, the present technology may also be configured as below.

[A01] «Image Display Device»

An image display device including:

(A) an image formation device; and (B) an optical system that brings an image from the image formation device to an eyeball of an observer, wherein $$0 \text{ (degrees)} \leq \omega_2 < \omega_1$$

is satisfied where an image-formation-device first strike point is defined as a point where an extended line of an optical axis of the optical system intersects with an image exit surface of the image formation device, a first normal line is defined as a normal line to the image exit surface of the image formation device passing through the image-formation-device first strike point, an image-formation-device second strike point is defined as a point where an extended line of a pupil center line of the eyeball of the observer intersects with the image exit surface of the image formation device, a second normal line is defined as a normal line to the image exit surface of the image formation device passing through the image-formation-device second strike point, and $\omega_1$ represents an angle between the extended line of the optical axis of the optical system and the first normal line, and $\omega_2$ represents an angle between the extended line of the pupil center line of the eyeball of the observer and the second normal line.

[A02]
The image display device according to [A01], wherein $$0 \text{ (degrees)} \leq \omega_2 \leq 1 \text{ (degrees)}$$

is satisfied.

[A03]
The image display device according to [A01] or [A02], further including:

a reflecting mirror configured to reflect an image from the image formation device, wherein the optical system is located between the eyeball of the observer and the reflecting mirror, and includes lens group which the image reflected by the reflecting mirror enters, and an optical axis of the lens group corresponds to the optical axis of the optical system.

[A04]
The image display device according to [A03], further including:

an optical member that is located between the reflecting mirror and the lens group and that has a freeform surface.

[A05]
The image display device according to [A04],
wherein the optical member has a thickness that is along a light transmission direction and that changes in a horizontal direction from an inside toward an outside.

[A06]
The image display device according to [A05],
wherein the freeform surface of the optical member has an odd-order curved surface in a horizontal direction.

[A07]
The image display device according to any one of [A03] to [A06],
wherein the reflecting mirror has a freeform surface.

[A08]
The image display device according to any one of [A03] to [A06],
wherein the reflecting mirror has a concave surface.

[A09]
The image display device according to any one of [A03] to [A08],
wherein a point where the optical axis of the optical system intersects with a surface of the lens group facing the observer is located closer to an outside than the pupil center line of the eyeball of the observer.

[A10]
The image display device according to any one of [A01] to [A09], wherein $$0 < \omega_3$$

is satisfied where $\omega_3$ represents an angle between an image projected onto a horizontal surface of the optical axis of the optical system and an image projected onto a horizontal surface of the pupil center line of the eyeball of the observer.

[B01] «Display Apparatus»
A display apparatus including:
(i) a frame; and
(ii) an image display device that is attached to the frame, wherein
the image display device includes
(A) an image formation device; and
(B) an optical system that brings an image from the image formation device to an eyeball of an observer, and $$0 \text{ (degrees)} \leq \omega_2 < \omega_1$$

is satisfied where an image-formation-device first strike point is defined as a point where an extended line of an optical axis of the optical system intersects with an image exit surface of the image formation device, a first normal line is defined as a normal line to the image exit surface of the image formation device passing through the image-formation-device first strike point, an image-formation-device second strike point is defined as a point where an extended line of a pupil center line of the eyeball of the observer intersects with the image exit surface of the image formation device, a second normal line is defined as a normal line to the image exit surface of the image formation device passing through the image-formation-device second strike point, and $\omega_1$ represents an angle between the extended line of the optical axis of the optical system and the first normal line, and $\omega_2$ represents an angle between the extended line of the pupil center line of the eyeball of the observer and the second normal line.

[B02]
The display apparatus according to [B01], wherein $$0 \text{ (degrees)} \leq \omega_2 \leq 1 \text{ (degrees)}$$

is satisfied.

[B03]
The display apparatus according to [B01] or [B02], wherein
the image display device further includes a reflecting mirror configured to reflect an image from the image formation device,
the optical system is located between the eyeball of the observer and the reflecting mirror, and includes lens group which the image reflected by the reflecting mirror enters, and
an optical axis of the lens group corresponds to the optical axis of the optical system.

[B04]
The display apparatus according to [B03], wherein
the image display device further includes an optical member that is located between the reflecting mirror and the lens group and that has a freeform surface.

[B05]
The display apparatus according to [B04],
wherein the optical member has a thickness that is along a light transmission direction and that changes in a horizontal direction from an inside toward an outside.

[B06]

The display apparatus according to [B05], wherein the freeform surface of the optical member has an odd-order curved surface in a horizontal direction.

[B07]

The display apparatus according to any one of [B03] to [B06], wherein the reflecting mirror has a freeform surface.

[B08]

The display apparatus according to any one of [B03] to [B06], wherein the reflecting mirror has a concave surface.

[B09]

The display apparatus according to any one of [B03] to [B08], wherein a point where the optical axis of the optical system intersects with a surface of the lens group facing the observer is located closer to an outside than the pupil center line of the eyeball of the observer.

[B10]

The image display device according to any one of [B01] to [B09], wherein $$0 < \omega_3$$

is satisfied where $\omega_3$ represents an angle between an image projected onto a horizontal surface of the optical axis of the optical system and an image projected onto a horizontal surface of the pupil center line of the eyeball of the observer.

[C01]

《Display Apparatus》

The display device according to any one of [B01] to [B10], including:

a left-eye image display device and a right-eye image display device attached to the frame, wherein a normal line to a reflecting mirror included in an optical system of the left-eye image display device intersects with a normal line to a reflecting mirror included in an optical system of the right-eye image display device, in a space on the opposite side of the reflecting mirrors from the observer.

[C02]

The display device according to [C01], wherein the normal line to the reflecting mirror included in the optical system of the left-eye image display device intersects with the normal line to the reflecting mirror included in the optical system of the right-eye image display device, below a virtual surface including both eyeballs of the observer and a point at infinity.

The display device according to [C01], wherein an xy-plane is defined as a virtual surface including both eyeballs of the observer and a point at infinity, an x-axis is defined as a straight line connecting both eyeballs of the observer, a y-axis is defined as a pupil center line of the right eye of the observer, a right-eye reflecting mirror optical axis strike point is defined as a point on the reflecting mirror where an optical axis of lens group in the right-eye image display device strikes the reflecting mirror, it is assumed that the reflecting mirror included in the right-eye image display device is located parallel to an xz-plane, furthermore, a ζ-axis is defined as an axial line on the reflecting mirror which is parallel to the xy-plane, passing through the right-eye reflecting mirror optical axis strike point, and an η-axis is defined as an axial line on the reflecting mirror which is orthogonal to the ζ-axis, passing through the right-eye reflecting mirror optical axis strike point, in this case, a plane mirror included in the right-eye image display device is rotated about the ζ-axis by an angle of $\theta_1$ of 45 degrees±5 degrees with a top of the plane mirror being rotated in a direction away from the observer, and is rotated about the η-axis by an angle $\theta_2$ of 7 degrees to 21 degrees with a right end of the plane mirror being rotated in a direction away from the observer, and the image formation device and optical system of the left-eye image display device, and the image formation device and optical system of the right-eye image display device, are mirror-symmetrical about a virtual surface which is parallel to a yz-plane, passing through the midpoint of a line segment connecting both eyeballs of the observer.

The display apparatus according to [C03], wherein the image formation device is located above the reflecting mirror.

[D01]

The display apparatus according to any one of [A01] to [C04], wherein the image display device further includes a support member configured to support the image formation device, and the support member configured to support the image formation device has a support surface which is curved in an X-direction, or in a Y-direction, or in the X-direction and the Y-direction, whereby the image formation device is curved.

[D02]

The display apparatus according to [D01], wherein a degree of a curve in the X-direction of the support surface of the support member is greater than a degree of a curve in the Y-direction of the support surface of the support member.

[D03]

The display apparatus according to [D01] or [D02], wherein the support member includes a pressing member, the image formation device has a rectangular outer shape, and the image formation device has an outer peripheral portion extending in the X-direction and fixed to the support member by the pressing member.

[D04]

The display apparatus according to [D01] or [D02], wherein the image formation device has a rectangular outer shape, and the image formation device has an outer peripheral portion extending in the X-direction and held by the support member.

[D05]

The display apparatus according to any one of [B01] to [D04], wherein the image display device includes an image-formation-device-and-reflecting-mirror-distance adjustment device configured to adjust a distance between the image formation device and the reflecting mirror.

[D06]

The display apparatus according to [D05], further including:

a display control device configured to control a size of an entire image from the image formation device, depending on the distance between the image formation device and the reflecting mirror.

[D07]

The display apparatus according to any one of [B01] to [D06], wherein the image display device includes an eyeball-and-lens-group-distance adjustment device configured to adjust a distance between the lens group and the eyeball of the observer.

[D08]

The display apparatus according to any one of [B01] to [D07], wherein the image display device further includes a rotation device configured to rotate the image formation device about at least one of an X-axis, a Y-axis, and a Z-axis, where the X-axis is defined as an axis which is parallel to the X-direction, passing through a predetermined point of the image formation device, and the Y-axis is defined as an axis which is parallel to the Y-direction, passing through a predetermined point of the image formation device.

[D09]

The display apparatus according to any one of [B01] to [D08], further including:

a movement device configured to move the image formation device in the X-direction with respect to the reflecting mirror.

[D10]

The display apparatus according to any one of [B01] to [D09], further including:

a left-eye image display device and a right-eye image display device attached to the frame, and an inter-image-display-device-distance adjustment device configured to adjust a distance between the left-eye image display device and the right-eye image display device.

[E01]

The display apparatus according to any one of [B01] to [D10], wherein the image formation device has a rectangular outer shape, and wiring extends to outside from an outer peripheral portion extending in the Y-direction of the image formation device.

REFERENCE SIGNS LIST 10 observer
11, 11L, 11R eyeball of observer
20 frame
21 front section
22 side section
22A hole section
23A arm
23B forehead pad
24 nose pad section
25 holding member
26 base
27A key
27B guide groove
27C fastening section
30, 30R, 30L image display device
40, 40L, 40R image formation device
50, 50L, 50R optical system
51, 51R, 51L reflecting mirror
52, 52R, 52L lens group
53R, 53L housing
54 optical member
60 support member
70 inter-image-display-device-distance adjustment device
71 base
72 side surface located outside base
73 feed screw mechanism
74A, 76A pin
75A tapped hole
74B, 75B, 76B guide groove
80 eyeball-and-lens-group-distance adjustment device
82 side wall
83 feed screw mechanism
90 image-formation-device-and-reflecting-mirror-distance adjustment device
91 adjustment device base member
92, 94 shaft
93 bushing
95 feed screw mechanism
96 latch mechanism
97 pin engaging latch mechanism

The invention claimed is:

1. An image display device, comprising:
   an image formation device;
   an optical system configured to bring a first image from the image formation device to an eyeball of an observer;
   a reflecting mirror; and
   an adjustment device configured to adjust a distance between the image formation device and the reflecting mirror based on satisfaction of a condition $$0 \text{ (degrees)} \leq \omega_2 < \omega_1 \leq 45 \text{ (degrees)},$$

wherein
   $\omega_1$ represents an angle between an extended line of an optical axis of the optical system and a first normal line,
   $\omega_2$ represents an angle between an extended line of a pupil center line of the eyeball of the observer and a second normal line,
   the first normal line is normal to an image exit surface of the image formation device and passes through an image-formation-device first strike point,
   the second normal line is normal to the image exit surface of the image formation device and passes through an image-formation-device second strike point,
   the image-formation-device first strike point is a point where the extended line of the optical axis of the optical system intersects with the image exit surface of the image formation device, and
   the image-formation-device second strike point is a point where the extended line of the pupil center line of the eyeball of the observer intersects with the image exit surface of the image formation device.

2. The image display device according to claim 1, wherein
   the reflecting mirror is configured to reflect the first image from the image formation device,
   the optical system is between the eyeball of the observer and the reflecting mirror,
   the optical system includes a lens group through which the first image, reflected by the reflecting mirror, enters the optical system, and
   an optical axis of the lens group corresponds to the optical axis of the optical system.

3. The image display device according to claim 2, further comprising an optical member located between the reflecting mirror and the lens group, wherein the optical member has a freeform surface.

4. The image display device according to claim 3, wherein
   a thickness of the optical member is along a light transmission direction, and
   the thickness of the optical member changes in a horizontal direction that extends from the observer towards the optical member.

5. The image display device according to claim 4, wherein the freeform surface of the optical member has an odd-order curved surface in the horizontal direction.

6. The image display device according to claim 2, wherein a point, where the optical axis of the optical system intersects with a surface of the lens group that faces the observer, is located outside of the pupil center line of the eyeball of the observer.

7. The image display device according to claim 1, wherein the reflecting mirror has a freeform surface.

8. The image display device according to claim 1, wherein the reflecting mirror has a concave surface.

9. The image display device according to claim 1, wherein $0<\omega_3<29$ (degrees) is satisfied, where $\omega_3$ represents an angle between a second image projected onto a horizontal surface of the optical axis of the optical system and a third image projected onto a horizontal surface of the pupil center line of the eyeball of the observer.

10. The image display device according to claim 1, wherein $0$ (degrees)$<\omega_2<1$ (degrees) is satisfied.

11. A display apparatus, comprising:
a frame; and
an image display device attached to the frame, wherein
the image display device includes:
an image formation device;
an optical system configured to bring an image from the image formation device to an eyeball of an observer;
a reflecting mirror; and
an adjustment device configured to adjust a distance between the image formation device and the reflecting mirror based on satisfaction of a condition
$0$ (degrees)$\leq \omega_2 < \omega_1 \leq 45$ (degrees), wherein;
$\omega_1$ represents an angle between an extended line of an optical axis of the optical system and a first normal line,
$\omega_2$ represents an angle between an extended line of a pupil center line of the eyeball of the observer and a second normal line,
the first normal line is normal to an image exit surface of the image formation device and passes through an image-formation-device first strike point,
the second normal line is normal to the image exit surface of the image formation device and passes through an image-formation-device second strike point,
the image-formation-device first strike point is a point where the extended line of the optical axis of the optical system intersects with the image exit surface of the image formation device, and
the image-formation-device second strike point is a point where the extended line of the pupil center line of the eyeball of the observer intersects with the image exit surface of the image formation device.

* * * * *